US011318911B1

(12) United States Patent
Richardson et al.

(10) Patent No.: US 11,318,911 B1
(45) Date of Patent: May 3, 2022

(54) REMOTE STARTING AND STOPPING ENGINE

(71) Applicant: FORD GLOBAL TECHNOLOGIES, LLC, Dearborn, MI (US)

(72) Inventors: Rob A. Richardson, Chelmsford (GB); Simon J. W. Hurr, Grays (GB); Christopher Harrison, Hornchurch (GB); Nicholas J. Brown, Hornchurch (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/188,161

(22) Filed: Mar. 1, 2021

(51) Int. Cl.
*B60R 25/04* (2013.01)
*B60R 25/20* (2013.01)
*F02N 11/08* (2006.01)

(52) U.S. Cl.
CPC ............ *B60R 25/04* (2013.01); *B60R 25/209* (2013.01); *B60R 25/2063* (2013.01); *F02N 11/0807* (2013.01); *F02N 2200/0803* (2013.01); *F02N 2200/102* (2013.01); *F02N 2200/103* (2013.01)

(58) Field of Classification Search
CPC ..... B60R 25/04; B60R 25/20; B60R 25/2063; F02N 11/0807; F02N 2200/102; F02N 2200/103; F02N 2200/0803; B60K 25/06
USPC ....................... 123/179.2; 340/5.61
See application file for complete search history.

(56) References Cited

U.S. PATENT DOCUMENTS

| | | | |
|---|---|---|---|
| 4,403,675 A | 9/1983 | Cardwell | |
| 5,696,408 A | 12/1997 | Man | |
| 7,391,131 B2 * | 6/2008 | Ono | B60R 25/209 307/10.6 |
| 7,915,998 B2 | 3/2011 | Matsubara et al. | |
| 9,132,805 B1 * | 9/2015 | King | B60R 25/21 |
| 2003/0047999 A1 * | 3/2003 | Chang | B60R 25/209 307/10.3 |
| 2004/0262068 A1 * | 12/2004 | Matsubara | B60R 25/209 180/287 |
| 2005/0030156 A1 * | 2/2005 | Alfonso | G07C 9/00182 340/5.61 |
| 2008/0068208 A1 * | 3/2008 | Hanselman | G08C 17/02 340/13.24 |
| 2008/0129473 A1 * | 6/2008 | Tsuruta | B60R 25/209 340/426.13 |
| 2009/0140846 A1 | 6/2009 | Rutledge | |
| 2009/0164074 A1 * | 6/2009 | Cui | B60K 25/06 701/51 |
| 2012/0018240 A1 * | 1/2012 | Grubaugh | B62D 51/02 180/273 |
| 2012/0031363 A1 * | 2/2012 | Barta | B60R 25/04 123/179.2 |

(Continued)

*Primary Examiner* — Phutthiwat Wongwian
*Assistant Examiner* — Arnold Castro
(74) *Attorney, Agent, or Firm* — Frank L. Lollo; MacMillan, Sobanski & Todd, LLC

(57) ABSTRACT

A vehicle apparatus has a controller, a first key reader disposed in a cabin of the vehicle, and a second key reader disposed external of the vehicle, such as on an auxiliary equipment. The controller is configured to actuate an engine control unit upon receipt of an authenticated signal. The controller is configured to receive a signal from the first key reader when the vehicle apparatus is operable in a first mode, and the controller is configured to receive a signal from the second key reader when the vehicle apparatus is operable in a second mode.

20 Claims, 11 Drawing Sheets

(56) References Cited

U.S. PATENT DOCUMENTS

| | | | |
|---|---|---|---|
| 2016/0177908 A1* | 6/2016 | Hirose | F02N 11/0807 123/179.2 |
| 2019/0202401 A1* | 7/2019 | Lee | B60R 25/10 |
| 2019/0217816 A1* | 7/2019 | Lee | G06K 19/06037 |
| 2020/0086357 A1* | 3/2020 | Liu | B08B 3/026 |

* cited by examiner

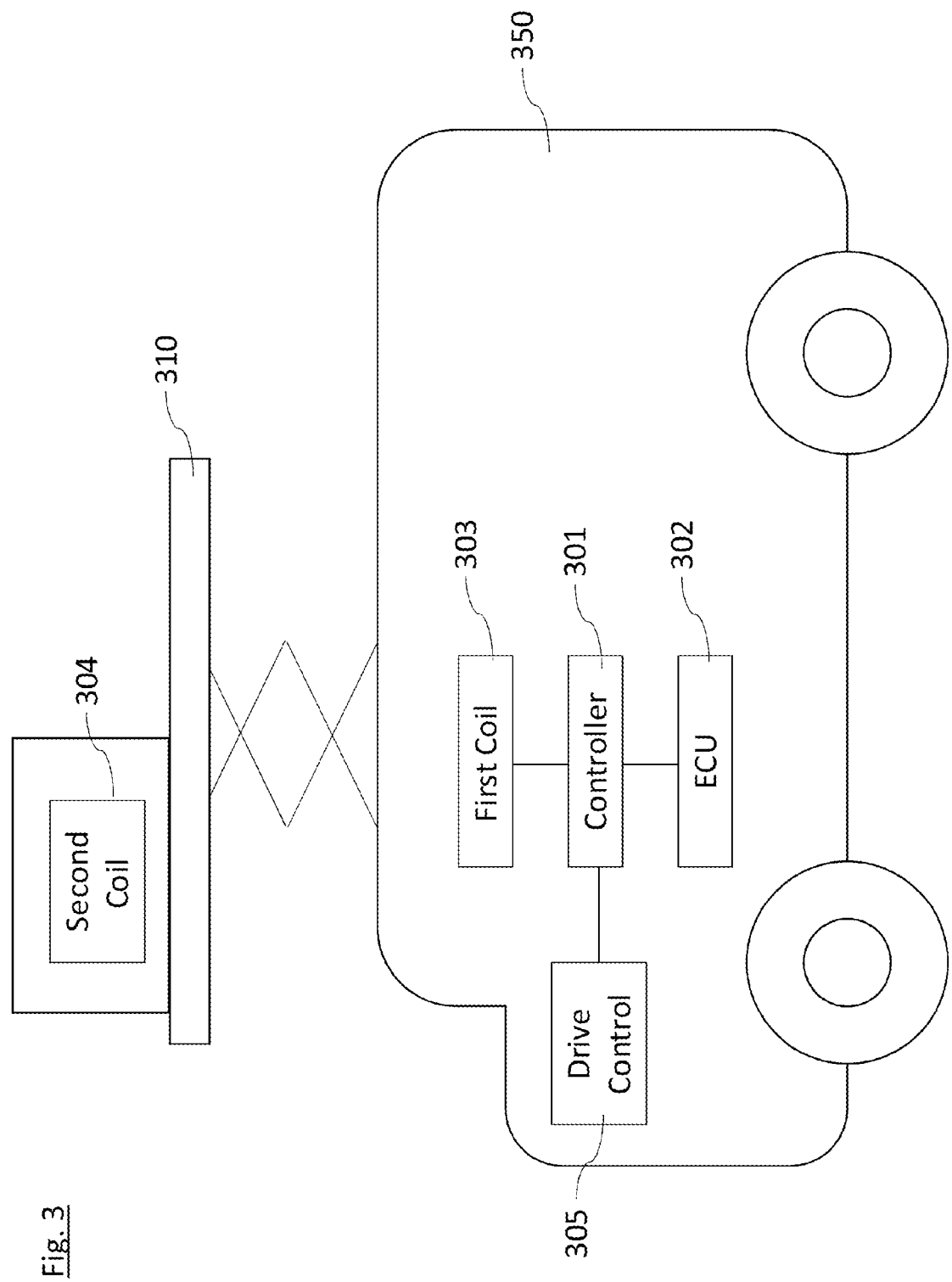

REMOTE STARTING AND STOPPING ENGINE

CROSS REFERENCE TO RELATED APPLICATIONS

This application claims priority to application 2005505.9, filed in the United Kingdom Intellectual Property Office on Apr. 15, 2020, which is incorporated herein by reference in its entirety.

STATEMENT REGARDING FEDERALLY SPONSORED RESEARCH

Not Applicable.

BACKGROUND OF THE INVENTION

The present invention relates in general to a vehicle apparatus for the control of a power source of a vehicle, and in particular, the remote activation and deactivation of the power source of a vehicle.

Some vehicles, such as commercial vehicles, are fitted with main power sources, such as engines, that are suitable for not only providing a source of rotational energy to a drivetrain of the vehicle but are also suitable for powering auxiliary equipment such that the vehicle is effectively a mobile power source.

Vehicles, especially commercial vehicles, are often used as sources of power for auxiliary equipment. For example, a vehicle comprising auxiliary equipment such as an aerial work platform or mechanized access platform (sometimes known as a "cherry picker" or "scissor lift") has an engine so that the vehicle may be moved (e.g., driven) but the vehicle's engine may also be used as a power source for the auxiliary equipment. The vehicle's engine may also be used as a power source for other auxiliary equipment such as a power outlet (which may or may not form part of the auxiliary equipment). Some examples herein are directed to a system for remotely starting and stopping an engine, which may comprise a Passive Anti-Theft System (PATS).

To provide power to the auxiliary equipment from the vehicle engine, the engine must remain on, or be in an ON (e.g., Run) state. Therefore, to provide power to the auxiliary equipment, a user may need to start the engine of the vehicle using a key, and then leave the key inside the cabin of vehicle (either inside an ignition barrel of the vehicle—e.g., where it is turned to a predetermined position to cause power to be maintained to the engine and or be visible to the Passive Anti-Theft System (PATS) induction coil system for an engine restart, or within a certain proximity of the vehicle engine in the case of a remote keyless system), to enable the engine to continue to run so that its power can be used for the auxiliary equipment, which is very often located outside the cabin of the vehicle (e.g., in examples where the vehicle is an aerial work platform or similar). The engine then may have to remain active, even when the auxiliary equipment only needs to draw power intermittently, unless the user of the vehicle repeatedly returns to the cabin of the vehicle to activate or deactivate the engine, which is not always practical.

This may pose certain security issues. For example, the vehicle, and/or its contents, could be subject to theft when the user of the vehicle is not directly present in the cabin of the vehicle since the user may be remote from the vehicle (e.g., in a cherry picker which may have been raised to a location above the vehicle). Therefore, if an opportunist thief were to attempt to gain access into the vehicle the user is unable to stop them as they are located away from the vehicle (e.g., in the air on a platform). In this case, a would-be thief may be able to steal the contents of the vehicle or even drive the vehicle away since the keys remain in the ignition. Furthermore, as the engine may remain constantly active, there may be times where engine power is being wasted (e.g. excessive fuel, wear on the engine, cost and emissions) if the auxiliary equipment only draws power from the engine intermittently. For example, when a user enters a cherry picker they need the power of the engine to raise the cherry picker to a desired height (e.g., for the user's work). Thereafter, the user may not need engine power again until such time when they have finished their job and need the engine power to lower the cherry picker, but with the keys remaining in the ignition and the user remote from the vehicle, it may be difficult or even impossible for the remote user to turn off the engine.

SUMMARY OF THE INVENTION

The present disclosure provides a vehicle apparatus, which may be referred to as a remote start-stop system or a passive anti-theft system by providing a means to use the existing key system and security with a wired solution to the local remote place of work. In this way there is provided an apparatus and method for the remote starting and stopping of a vehicle engine via the existing security features.

According to some embodiments of the invention, there is provided a vehicle apparatus that is able to provide engine power to an auxiliary component (as described above) while a vehicle key is not in the ignition. Put another way, some examples of this disclosure allow a user to switch a vehicle engine on, then remove their keys from the vehicle ignition, with the engine remaining on even though the keys are remote from the vehicle. Some examples herein also allow the user to stop power being supplied to the engine even though the user and the key may be remote from the vehicle. Moreover, some examples herein allow the user to start a stopped engine even though the user and the key may be remote from the vehicle.

According to these examples, where the vehicle comprises a cherry picker, a user may start the vehicle engine from the vehicle cab using the vehicle key, may remove the key but the vehicle keeps the engine running, and the user may then enter the cherry picker, raise the cherry picker (using the engine power). The user and the original vehicle key are both located in the cherry picker which has been raised to a height remote from the vehicle cab. The user may then turn the engine off from their remote location even though the vehicle key is with the user and remote from the vehicle. The user may then perform a task from the cherry picker with the engine off so that the engine does not use power unnecessarily. Upon completion of the user's work job they may then start the engine, from their remote location in the cherry picker, and the engine power may then be used to lower the cherry picker. It will be appreciated that the vehicle apparatus in these examples comprises of the full original vehicles anti-theft system (for example a passive or active anti-theft system) in the sense that the vehicle engine is running despite the vehicle key not being inside the vehicle—allowing the vehicle to be locked to prevent unauthorized entry or drive-away. It will also be appreciated that the vehicle apparatus in these examples comprises a remote start-stop system in that the engine may be started, or stopped, "remotely" (e.g., by a user remote from the vehicle, such as a user outside a passenger compartment of the vehicle) and in a manner that does not require the vehicle key to be located within the vehicle.

To achieve this, some examples herein provide an apparatus that can be placed in a mode to allow the engine to be remotely started and stopped (e.g. without the key being inside the vehicle).

To achieve this, some examples herein provide an apparatus that is operable in both a first and a second mode of operation, the first mode being a mode in which the apparatus can start the engine when an authentic signal is received from a key proximate the vehicle cab (e.g., a driving control of the vehicle), such as when the key is placed in the ignition barrel. In these examples, when the apparatus is in this first mode, the apparatus may be able to be placed in a second mode, the second mode being a mode in which the apparatus can start the engine when an authentic security handshake signal is received from the original vehicle key, remote to the vehicle cab (e.g., from the top of a cherry picker, in the rear of a van, used as a workshop, or scissor lift or from a location on the ground remote from the vehicle cab).

As will now be described, to achieve this, first and second vehicle key readers (which, as will be described below, may describe coils, e.g., transceiver coils), that communicate the security data from the key to the vehicle, may be configured to energize the vehicle key to cause a transponder in the vehicle key to send a signal to a controller of the vehicle, the controller being configured to actuate an engine control unit of the vehicle to power the vehicle engine when the controller can authenticate the signal (thereby confirming the authenticity of the vehicle key). In this way, the engine may be started in this mode, only by the remote PATS coil and not the normal cab coil.

According to an aspect of the present invention, there is provided a vehicle apparatus comprising a controller configured to actuate an engine control unit of a vehicle upon receipt of an authentic signal. The engine control unit is configured to actuate an engine of the vehicle and the actuation of the engine control unit (ECU) may cause the ECU to start the engine (if the engine is in a stopped state) or stop the engine (if the engine is running). The apparatus also comprises a first (e.g., a "main") key reader and a second key reader. The controller is configured to receive a signal and to authenticate the received signal. For example, the controller is configured to store data relating to the authenticity of a signal such that by comparing the received signal to the stored data the controller is able to authenticate the received signal. As will be explained below, each signal may be a vehicle key signal so that the controller is configured to authenticate a vehicle key. Upon authentication of the received signal, the controller is configured to actuate the engine control unit. The vehicle apparatus is operable in a first mode of operation in which the controller is configured to receive a signal from the first key reader and operable in a second mode of operation in which the controller is configured to receive a signal from the second key reader. In some examples, in the first mode of operation, the controller is not configured to receive a signal from the second key reader (e.g., is not connected to the second key reader for normal driving) and, in the second mode of operation, the controller is not configured to receive a signal from the first key reader (e.g., is not connected to the first key reader) such as in a static power take off mode.

In this way, each of the first and second key reader are configured to transmit a signal to the controller but the controller is only able to respond to a received signal from one of the key readers, depending on the mode of operation of the apparatus. The signal may be a signal that is received from the vehicle key and therefore each one of the first and second key readers are configured to transmit a signal indicative of a vehicle key, that signal being transmitted to the controller for authentication. In this way, the controller may cause the ECU to start the engine upon receipt of an authentic signal from two different places as the first and second key reader may each be placed in a different location.

Of course, the ECU will not start the engine if the controller is not able to authenticate the received signal (which will be the case if the key is not the correct key).

In some examples, the first mode of the operation of the apparatus may configure the controller to receive a signal from a key reader within a cabin of the vehicle, e.g. proximate a driving control. For example, the controller may be configured to receive a signal from a key reader which is disposed proximate, within, or on the ignition barrel of the vehicle. The second mode of operation of the apparatus may configure the controller to receive a signal from a key reader disposed outside of the cabin of the vehicle. For example, the controller may be configured to receive a signal from a second key reader which may be disposed within a control panel of auxiliary equipment powered by the vehicle engine (e.g., the cradle, or cabin, of a cherry picker or scissor-lift etc.).

Each of the first and second key reader may be energizable to produce an electromagnetic field. For example, each of the first or second key reader may be energizable to produce the electromagnetic field by the controller, e.g., upon receipt of a signal transmitted by the controller (e.g., an electric signal). The first and/or second key reader may each comprise a coil, the coil configured to be powered by an electric signal to produce an electromagnetic field. For example, the controller may be configured to transmit a signal to each coil (depending on the mode of operation of the apparatus) to energize the coils so that the coils produce the electromagnetic field. The electromagnetic field produced by either one of the first or the second key reader may be configured to energize a transponder of a vehicle key. Put another way, when a vehicle key comprising a transponder is proximate an electromagnetic field generated by either the first or second key reader (e.g., a first or second coil), the electromagnetic field may cause the transponder to transmit a vehicle key signal to the first or second key reader, and the first or second key reader may relay the signal to the controller for authentication. The first and/or second key reader may therefore be configured to generate an electromagnetic field to cause a transponder to transmit a signal to the first and second key reader, the first and second key reader being further configured to transmit a signal received by the transponder to the controller. In examples where the first and/or second key reader may therefore comprise a transmitter-receiver, or transceiver, for example a transmitter-receiver coil or transceiver coil. The first and/or second key reader may be configured to generate an electromagnetic field when the transponder of the vehicle key is brought into proximity to the key reader. For example, the first key reader may be configured to be energized by the controller to produce an electromagnetic field when the vehicle key is inserted into the ignition barrel of a vehicle and turned to a predetermined position (e.g., a position which causes the controller to be energized/power to be supplied to the controller—in some vehicles this is referred to as "position 2"). For example, the apparatus may be configured such that when a vehicle key is inserted into the ignition barrel and turned to a predetermined position, the controller may be energized and caused to energize the key reader to generate the electromagnetic field which will cause the key to transmit a signal to the key reader, the first key reader transmitting the signal to the controller for authentication. In these examples, the first key reader may comprise a transceiver coil proximate, on, or in the ignition barrel.

In some examples, the vehicle apparatus may comprise a key for the vehicle, and the key comprises the transponder configured to transmit a signal to the first or second key reader, for example when the transponder is proximate the electromagnetic field generated by the first and/or second key reader. The transponder may transmit the signal to the first or second key reader when it is within an electromagnetic field produced by the first or second key reader or within a predetermined distance of the first or second key reader, respectively. The signal transmitted by the transponder may be an optical signal, an electromagnetic signal, or any other appropriate form of signal that could carry unique information suitable for the purposes of authentication. The first or second key reader may be energizable by the controller to receive the signal transmitted by the transponder of the vehicle key substantially simultaneously as it is energizable to produce the electromagnetic field to energize the transponder (in other words, the timescale involved for the controller to cause the key reader to create the electromagnetic field and receive and transmit the key signal to the controller may be extremely short such that authentication is near instantaneous). Alternatively, in some examples, the first or second key reader may be configured to receive a signal from the transponder at all times.

In some examples, the vehicle apparatus may comprise the first key reader. The first key reader is proximate to a driving control of the vehicle (e.g., the ignition barrel and/or steering wheel and/or dash panel etc.). In some examples, the second key reader is remote from the driving control of the vehicle (for example the second key reader may be disposed outside the vehicle). For example, the first key reader may be disposed in the ignition barrel or the steering wheel of a vehicle so as to require engine start when a user is inside the vehicle and the second key reader may be disposed in a control panel of an auxiliary system (e.g., a piece of auxiliary equipment) located outside of the vehicle, for example in a cradle of a cherry picker.

In some examples, the vehicle apparatus may comprise a first switch operable in a first configuration in which the first switch connects (e.g., electrically or electromagnetically connects) the controller to the first key reader (or the first coil in examples where the key reader comprises a coil). The first switch is also operable in a second configuration in which the first switch connects (e.g., electrically or electromagnetically connects) the controller to the second key reader (or the second coil in examples where the key reader comprises a coil). The first switch may connect the controller to the first or second key reader by any appropriate means (e.g., via Bluetooth, optical link, or radio). The first switch may therefore comprise an electrical switch to complete or break an electrical path between the controller and the first or second actuator depending on its configuration. For example, the first switch may be configured to complete an electrical circuit between the controller and the first actuator (and break an electrical circuit between the controller and the second actuator) when in its first configuration and may be configured to complete an electrical circuit between the controller and the second actuator (and break an electrical circuit between the controller and the first actuator) when in its second configuration.

The first switch may be configured to be in the first configuration when the apparatus is operable in the first mode, and the switch may be configured to be in the second configuration when the apparatus is operable in the second mode. In this way, according to these examples, when the apparatus is operable in the first mode, the first switch connects the controller to the first key reader such that the controller is configured to receive a signal from the first key reader and, when the apparatus is operable in the second mode, the first switch connects the controller to the second key reader such that the controller is configured to receive a signal from the second key reader. In this way, the controller is therefore configured to receive a signal from the first or second key reader via the first switch depending upon which mode is required (although in other examples the controller may be otherwise configured). Therefore, in these examples the configuration of the first switch may determine in which mode the apparatus operates. In other words, switching the first switch between its configurations may cause the apparatus to switch between its modes and therefore different vehicle functionality usage from the engine—either auxiliary power take off or normal driving.

In some examples, the vehicle apparatus may comprise a first actuator coupled to and configured to move, operate, or actuate the first switch (e.g., a switching device, or flip-flop relay etc.). For example, the first actuator may be configured to actuate the switch to move between its first and second configurations. In this way, the first actuator is configured to actuate (or move) the vehicle apparatus between its first and second modes of operation. In this way, the first actuator may cause the controller to be configured to receive a signal from the first or second key reader. The first actuator may be disposed within the cabin of the vehicle. The first actuator may be a physical button operable by a user of a vehicle at their discretion. The first actuator may therefore comprise a user-manipulatable element (for example, a pressable or pushable button or turnable dial or may be automatically controllable (e.g., automated) from auxiliary equipment). Alternatively, the first actuator may be actuated via means of a mobile application or a voice command system. The first actuator may be configured to only allow authorized users of the vehicle to actuate the first switch. The first actuator may be configured to be actuated remotely.

In this way, a user is able to place the apparatus in a mode in which the controller is configured to receive a signal from the first or second key reader. For example, when the second key reader is a remote key reader, a user may cause the first actuator to cause the switch to move to its second configuration to connect the controller to the second key reader, and in this way the user has caused the apparatus to transition to a mode in which the controller is configured to actuate the ECU to start the engine upon receipt of an authentic signal from a remote area (e.g., a cherry picker cradle or rear of the vehicle etc.), and therefore to remotely start the engine.

In some examples, the vehicle apparatus may be configured to be moved from its first mode to its second mode, e.g., via the first actuator causing the first switch to transition from its first configuration to its second configuration, if at least one precondition is met (in some examples, only if at least one precondition is met). The vehicle apparatus may be configured to be moved from its first mode to its second mode if a set of preconditions are met (e.g., only if all preconditions in the set are met). In this way, according to some examples, only when a certain condition, or set of conditions, are met is the user able to place the apparatus into its second mode where it can receive a signal from a remote key reader, and thereby remotely start the engine.

In some examples, the vehicle apparatus may comprise an interlock switch operably connected to the first actuator. The interlock switch may be movable between a closed and an open state, wherein the interlock switch, in its closed state, is configured to connect the first actuator to the first switch and, in its open state, is configured to isolate (e.g., not connect) the first actuator from the first switch. For example, the interlock switch may comprise an electrical switch that is configured to complete or break an electrical connection between the first actuator and the first switch. For example, when the interlock switch is open the interlock switch may be configured to electrically isolate the first actuator from the first switch and when the interlock switch is closed the interlock switch may be configured to electrically connect the first actuator to the first switch. In this way, the first actuator is able to place the apparatus in the second mode of operation so that the engine may be remotely started (as described above) but only when the interlock switch is closed. As will now be described, the interlock switch may ensure that the apparatus cannot be placed in its second mode unless a precondition or a set of preconditions are met for this purpose, the interlock switch may be configured to move, or switch, from its open state to its closed state (e.g., automatically) if, or only if, the at least one precondition is met.

The precondition, or set of preconditions may comprise at least one of the following conditions: a clutch pedal of the vehicle is at least partially depressed, the cabin of the vehicle is completely locked, a handbrake of the vehicle is activated (e.g. is on), a throttle pedal of the vehicle is disengaged, and/or a brake pedal of the vehicle is at least partially depressed. In this way, a set of conditions must be present in order for the apparatus to be placed into its second (remote) mode. For these reasons the switch is referred to as an "interlock switch" since these conditions may be known as interlocks. Accordingly, if the precondition (which may also be referred to as an interlock condition or interlock) is not met or the set of preconditions are not all met then the interlock switch remains open and the first actuator cannot place the apparatus in its second mode as it is not able cause the first switch to move to its second configuration, since the first actuator is not connected to the first switch when the interlock switch is open. Therefore, only when the interlock switch is closed is the first actuator configured to place the apparatus in its second mode, since only when the interlock switch is closed is the first actuator connected to the first switch. In some examples, a clutch pedal of the vehicle being at least partially depressed may be an interlock to start the engine, rather than an interlock allowing the second key reader activation. For example, the precondition, or set of preconditions may comprise at least one of the following conditions: the cabin of the vehicle is completely locked, a handbrake of the vehicle is activated (e.g. is on), a throttle pedal of the vehicle is disengaged, and/or a brake pedal of the vehicle is at least partially depressed; and, in addition to this precondition, the ECU may be configured such that it will not start the engine, or the engine may not start, unless a clutch pedal is at least partially depressed. The function of the first actuator will be further explained below, since the first actuator is essentially configured to place the apparatus in "remote mode" (when the second key reader is remote from the vehicle cab) by causing the switch to move from its first to its second configuration.

In some examples, the interlock switch may be configured such that when it is being operated in its second mode and at least one of the precondition(s) is violated, the interlock switch moves from its closed state to its open state of the second key reader, to a rest state of closed to the first key reader. In the state of the first key reader state, with the system for remote engine control disabled, the vehicle is put back to normal drive mode when the normal process of starting the engine is required including turning the key in the appropriate position to start the engine. In some examples, the apparatus is configured such that when it is being operated in its second mode and at least one precondition is violated, the ECU is configured to stop the engine, thereby preventing supply of power from the main power source of the vehicle.

In some examples, the vehicle apparatus may comprise an ignition barrel. As described above, when the apparatus is in its first mode (e.g., when the first switch is in its first configuration so that the controller is connected to the first key reader) the controller is configured to receive a signal from the first key reader). As also described above, the signal may comprise a key signal which may be transmitted from the same key, via the first key reader to the controller. As also described above, the controller may be configured to energize the first key reader (e.g., powering the key reader so the key reader is energized). According to some examples, the controller is configured to supply power to the first key reader to cause the key reader to be energized when a vehicle key is inserted into the ignition barrel of the vehicle and turned to a predetermined position (e.g., position 2), this position of the vehicle key being predetermined to supply power to the controller and/or the ECU. Therefore, in order to start the engine when the apparatus is in the first mode, the vehicle key may need to be inserted in the ignition barrel and turned to the predetermined position (so that the controller can by energized to energize the first key reader etc.). In this way, the action "key to position 2" "wakes up" or energizes the controller, and therefore "wakes up" or energizes the first key reader. The key being in this position may cause a voltage of 12V to be supplied to the controller.

Therefore, according to one example, the first key reader is proximate the ignition barrel and the apparatus is configured such that, when the apparatus is operating in its first mode, power is supplied to the controller upon a vehicle key being inserted into the ignition barrel and turned to a predetermined position. The controller may also be configured to energize the first key reader when the key is in in the predetermined position, the first key reader being configured to produce an electromagnetic field upon energization. The vehicle key may be configured to transmit a signal to the first key reader when the key is proximate the electromagnetic field (which may already be the case since the key is in the ignition barrel) and the first key reader is configured to transmit the signal received from the vehicle key to the controller, which is configured to authenticate the signal and to actuate the engine control unit if the signal is authentic, as described above.

The apparatus may be additionally configured to cause power to be supplied to the controller and/or the engine control unit, to thereby run the engine, when the vehicle key is not inserted into the ignition barrel—e.g., upon removal of the vehicle key from the ignition barrel. Put another way, the apparatus is configured such that, when the engine is started when the apparatus is in its first mode, the ECU is configured to continue to run the engine even if the key is removed from the ignition barrel. This is done by the system keeping a supply of voltage (+12V) to the ignition position 2 supply to the controller. The Controller still assumes the keys are in the ignition. The keys are then relocated to the second key reader and in this remote mode, the engine can be shut down by removing this +12V feed. To restart the engine remotely, the +12V is reapplied to ignition position 2, the key is still acknowledged as being read by the second key reader and as long as all interlocks are met, the engine can be restarted via a +12V signal to ignition position 3, namely the engine cranking circuit of the ignition barrel.

However, in other examples, e.g., for keyless entry, instead of power being caused to be supplied to the controller upon the key being present in an ignition and turned to a predetermined position, power may be caused to be supplied to the controller when a vehicle key is within a predetermined distance of the vehicle, or a vehicle control module etc.

More specifically, the first actuator is configured to move the switch from its first configuration to its second configuration to place the apparatus in its second mode (e.g., a "remote mode" when the second key reader is a remote key reader). As explained above, the first actuator is configured to move the switch to its second configuration to place the apparatus in its second mode when at least one precondition is met. The first actuator may be configured to actuate the switch to move to its second configuration upon receipt of an authentication signal (e.g., transmitted via the first key reader). The first actuator may be configured to place the apparatus in its second mode only when an interlock condition is present and when the engine is running and/or when an authentication signal has been received.

The first switch may be configured to, when in its second configuration, cause power to be supplied to the controller and/or the ECU to keep the engine running when the apparatus is in its second mode. In other words, when the switch is in its second configuration, power will continue to be supplied to the controller and/or the ECU so that the engine is running. In this way, the engine may continue to be run even when the key is removed from the vehicle ignition. Put another way, the first actuator may, by causing the switch to move to its second configuration and place the apparatus in the second mode in which the engine continues to run even though the vehicle key is removed. For example, when the switch is in its second configuration, 12V may be supplied to the controller and/or the ECU to keep the engine running. In this way, the second mode of operation of the vehicle apparatus is a mode where the engine continues to run even though a key is not proximate the first key reader (e.g., when not inside the ignition barrel etc. or not within a predetermined distance of the vehicle). In this way, the user is able to take the vehicle key out of the vehicle, lock the vehicle, and be in a position remote from the vehicle. When the second key reader is remote from the vehicle this second mode of operation is therefore a remote mode where the engine may be stopped and started by the user (having the vehicle key) being remote from the vehicle.

According to some examples, when in the second mode, an actuator (e.g., an on/off switch) may cause the ECU to stop the engine, for example by causing power to be no longer be supplied to the controller and/or the ECU.

According to some examples as will now be described, when the apparatus is in the second mode, the engine may be then started, e.g., started remotely by a user. When the apparatus is in the second mode, the controller is connected to the second key reader. The controller is configured to energize the key reader to cause an electromagnetic field that will cause the key to transmit a signal to the controller, via the second key reader, to cause the ECU to start the engine if the key is authentic. However, if the ECU has stopped the engine, the controller may not be able to energize the second key reader as the controller is no longer powered. Put another way, the 12V being supplied to the engine as a result of the first switch being in its second configuration may cease when the engine is stopped. Therefore, to remotely start the engine again (via an authentic key signal transmitted via the second key reader), power may first need to be supplied to the controller.

For this purpose, in some examples, the vehicle apparatus may comprise a second actuator and a second switch movable between an open and a closed state. The second switch may be configured to connect (e.g., electrically or electromagnetically connect) the second actuator to the controller when the second switch is in its closed state. When the second switch is in an open state, the switch is configured to isolate the second actuator from the controller. The second actuator is configured to supply power to the controller. Therefore, the second actuator is able to supply power to the controller (so that the controller may energize the second key reader to cause the key to transmit a signal, etc.) when the second switch is in its closed state (otherwise the second actuator is not connected to the controller). In other words, when the second switch is in its closed state, the engine is able to be started remotely when the correct key is proximate the electromagnetic field of the (energized) second key reader. The second actuator may therefore comprise a user-manipulatable element (for example, a pressable or pushable button or turnable dial or may be automatically controllable (e.g. automated) from auxiliary equipment, etc.), user-manipulation of which may cause power to be supplied to the engine if the second switch is closed. Alternatively, the second actuator may be actuated by means of a mobile application or a voice command system, etc.

Some engines may not be able to be started if a precondition (or interlock condition or interlock, etc.) is not met. For example, some engines may not be able to be started unless a clutch pedal is at least partially depressed. According to some examples herein, the apparatus is able to mimic the clutch pedal being depressed so that the engine can be started and the second switch is configured to move from its open state to its closed state upon receipt of a signal indicating that the vehicle clutch pedal is at least partially depressed. Therefore, the second switch is configured to close (so that the second actuator can start the engine) only when a signal is received indicating (e.g., mimicking) the clutch pedal is depressed. In some examples, the vehicle apparatus may comprise a third actuator configured to cause a signal to be generated by a signal generator, the signal being configured to be sent to the second switch, the signal being indicative of the clutch pedal being at least partially depressed. Essentially, the signal is to override the interlock of the engine that would otherwise prevent it from start unless the clutch pedal is at least partially depressed, and the signal is to mimic this depression of the clutch. In this example, the second switch may be configured to move from its open state to its closed state upon receipt of the signal. The third actuator may be a physical button operable by a user of a vehicle at their discretion. Alternatively, the third actuator may be actuated by means of a mobile application or a voice command system. The third actuator may be configured to only allow authorized users of the vehicle to actuate the second switch. For this purpose, according to some examples, the third actuator may cause the signal to be sent to the engine, thereby overriding the engine interlock, and by causing the second switch to close this signal thereby places the engine into a condition ready to be started and allows the second actuator to supply power to the controller so that the controller can energize the second key reader, which will cause the second key reader to generate the electromagnetic field allowing a key signal to be authenticated by the controller so that the controller can (remotely) start the engine. More specifically, when the apparatus is placed in its second mode, the engine is able to be remotely turned off and also turned on. The remote turning on of the engine may be achieved when a user actuates (e.g., presses) the third and second actuators, causing power (e.g., 12V) to be supplied to the controller. For example, a user may do this when they have finished their job in the cherry picker cradle and they want to lower the cherry picker cradle. Once power is supplied to the controller, the controller energizes the second key reader (as in the second mode the controller is connected to the key reader) and when the user places the key proximate the electromagnetic field, the key signal is transmitted to the second key reader which is relayed to the controller and then authenticated—the engine can thereby start remotely.

It will therefore be appreciated that the vehicle apparatus disclosed herein provides a remote start/stop system whereby the first actuator is configured to place the apparatus into a mode where the engine may be stopped and started remotely (the remote starting of the engine being via the second actuator as described above). Preconditions need to be met for the first actuator to be able to place the system in the "remote mode" (as described above) and the first actuator places the system in its remote mode by causing a switch (e.g., an electrical relay) to adopt a configuration where the controller is connected to a remote key reader (e.g., an electromagnetic coil). As described above, placing the apparatus into its second (remote) mode may cause power to be supplied to the controller and/or ECU so that the engine can continue to run even when the vehicle key is out of the ignition barrel. Then, once the engine is stopped and the apparatus is in its second mode, the second and third actuators can cause the engine to start remotely by causing power to be supplied to the controller and a signal to be sent to the engine overriding the interlock that the clutch pedal must be depressed before the engine can start (by transmitting a signal that can mimic or replicate this state). Then, when an authentic key signal is received via the second key reader (or coil), the system can be started remotely.

The first actuator may allow a timed period for the operator to start the engine and system from the cab of the vehicle (e.g., via the first key reader), thereby meeting certain legal requirements of safe engine start whilst under normal drivers control, to then allow a remote mode where the vehicle cannot be moved thereafter, without causing system shut down.

According to this disclosure there is provided a method for remotely starting/stopping an engine. The method may comprise a computer-implemented method, for example the method may be performed using at least one processor, for example executing instructions that are to cause the processor to perform the method. According to another aspect of this disclosure, there is provided a method of operating the apparatus as described above. The method comprises, operating the vehicle apparatus in its first mode in which the controller is configured to receive a signal from a first key reader. The method comprises receiving a signal from the first key reader, authenticating the signal received from the first key reader and actuating, by the controller, the engine control unit. This may be performed for example by a user when the user in inside the vehicle, e.g., as described above. The method also comprises operating the vehicle apparatus in a second mode in which the controller is configured to receive a signal from a second key reader, authenticating the signal received from the second key reader, and actuating, by the controller, the engine control unit. This may be performed for example by a user remote from the vehicle (e.g., in a cherry picker cradle), e.g., as described above. In some examples, the method may also comprise energizing the first key reader, creating at the first key reader an electromagnetic field, placing a vehicle key in the electromagnetic field, transmitting a signal from the vehicle key to the first key reader, transmitting a signal from the first key reader to the controller, authenticating the signal received from the first key reader via the controller, and actuating, by the controller, the engine control unit; when the vehicle apparatus is in its first mode.

In some examples, the method may also comprise energizing the first key reader, creating at the second key reader an electromagnetic field, placing a vehicle key in the electric field, transmitting a signal from the vehicle key to the second key reader, transmitting a signal from the second key reader to the controller, authenticating the signal received from the second key reader via the controller, and actuating, by the controller, the engine control unit, when the controller is in the second mode.

Placing the vehicle apparatus in its first mode may comprise actuating the first switch to connect (e.g., electrically or electromagnetically) the controller to the first key reader. Placing the vehicle apparatus in its second mode may comprise actuating the first switch to connect (e.g., electrically or electromagnetically) the controller to the second key reader.

In some examples, the method may further comprise determining whether at least one precondition is met and, if it is determined that one of the at least one preconditions are met, the method may further comprise actuating the first switch to electrically connect the controller to the second key reader. For example, the method may comprise operating the interlock switch such that the first actuator is connected to the first switch when the interlock switch is in a closed state. The method may further comprise closing the interlock switch to electrically connect the switch actuator and the first switch when at least one precondition is met. The precondition may be as described above and may comprise a set of preconditions.

In some examples, the method may comprise operating the apparatus in the first mode, placing a vehicle key into an ignition barrel of the vehicle, turning the vehicle key to a predetermined position in the barrel, receiving, at the controller, an authentication signal from the first key reader, causing power to be supplied to the engine control unit to thereby run the engine, operating the vehicle apparatus in the second mode, removing the vehicle key from the ignition barrel, and continuing to supply power to the engine control unit to thereby run the engine—for example as described above by actuation of the first actuator to cause the apparatus to be in its second mode and to cause power to be supplied to the controller so that the engine can be started when the apparatus is in its second mode. Closing the first switch may therefore comprise supplying power to the controller and/or the ECU of the vehicle. In some examples, the method may comprise, when the engine is in an off state and the vehicle apparatus is in the second mode, receiving a signal indicating that a clutch pedal of the vehicle has been at least partially depressed. The method may further comprise, upon receipt of an authentication signal from the second key reader, causing power to be supplied to the engine control unit to thereby run the engine. For example, as described above, the method may comprise receiving a signal indicative of a clutch pedal being depressed and, upon receipt of this signal, causing a switch to connect (e.g., electrically or electromagnetically) a second actuator such that, when the switch is closed, the second actuator causes power to be supplied to the controller and/or engine to power the engine.

Herein, by "switch" it is intended to comprise any form of switching device, for example a flip-flop relay.

The disclosure also provides software, such as a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 3 is a block diagram showing a vehicle comprising an embodiment of the vehicle apparatus.

DETAILED DESCRIPTION OF PREFERRED EMBODIMENTS

Figure 1A:
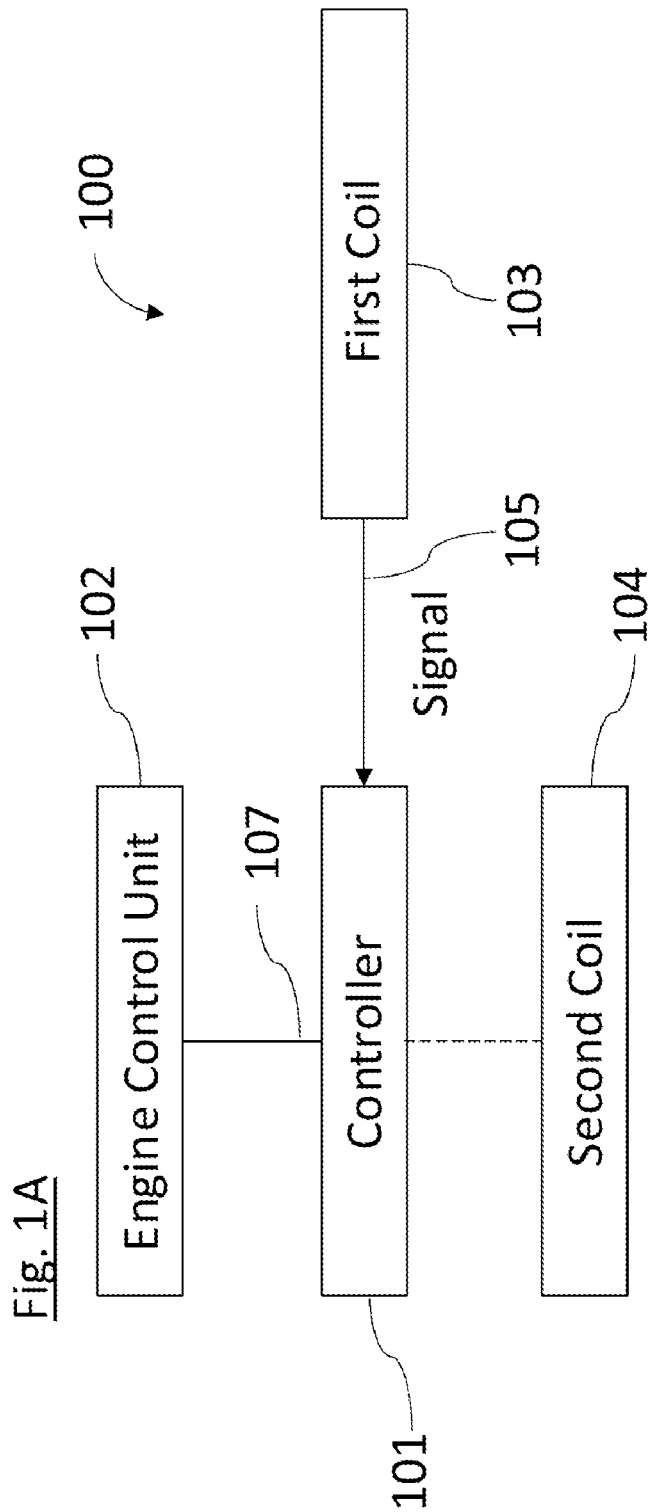
FIG. 1A is a block diagram showing an embodiment of the vehicle apparatus operable in the first mode.

The present invention relates to a vehicle apparatus for a vehicle such as a motor vehicle (e.g., a car, van, truck, motorcycle, etc., including commercial vehicles), an industrial or agricultural vehicle (e.g., a tractor, forklift, bulldozer, excavator, cherry picker or scissor-lift), marine vessel, aircraft, or any other type of vehicle. The vehicle apparatus may comprise, or be associated with, auxiliary equipment, such as a cherry picker cradle, a generator, a power outlet, or a pump etc. that is to be powered by the engine of the vehicle (directly or through a conversion device, such as an alternator).

The examples described herein provide a vehicle apparatus having a first key reader, a second key reader, and a controller configured to actuate an engine control unit. In these examples, the controller is configured to receive a signal and to authenticate the signal. In these examples, the apparatus is operable in a first mode in which the controller is configured to receive a signal from the first key reader and is operable in a second mode in which the controller is configured to receive a signal from the second key reader. Some examples of the vehicle apparatus comprise a vehicle key which comprises a transponder capable of being energized to produce a unique signal receivable by the key reader. In these examples, the vehicle apparatus may comprise a first switch to toggle the vehicle apparatus between being operable in the first and second operable modes. Some examples of the vehicle apparatus may include an actuator to allow the user of the vehicle to toggle the vehicle apparatus from the first operable mode to the second operable mode via the first switch. In these examples, the actuator may be electrically coupled or isolated from the controller via means of an interlock switch. The interlock switch may keep the actuator isolated from the controller unless at least one of a plurality of preconditions are met. Some examples of the vehicle apparatus may comprise a second actuator and a second switch, wherein, the second actuator is configured to enable power to be provided to the controller, for example when the apparatus is operable in its second mode. In these examples, the second switch may electrically isolate the second actuator from the controller in one configuration when the second switch is in a first configuration, and electrically connect the second actuator to the controller when the second switch is in a second configuration. In these examples, the vehicle apparatus may have a signal generator configured to generate a signal indicative of a clutch pedal of the vehicle being at least partially depressed in order for the second actuator to provide power to the controller. In these examples, the vehicle apparatus may further comprise a third actuator directly operable by the user, configured to cause the signal generator to generate a signal indicative of a clutch pedal of the vehicle being at least partially depressed.

The example vehicle apparatus described herein may provide much more flexibility for a user by providing a secure way of remotely accessing power from the main power source of a vehicle for use by auxiliary equipment, as and when needed, by providing the user with the capability of remotely starting and stopping the engine when the user and the vehicle key are remote from the vehicle. This may result in a user operating the main power in a more fuel efficient way, as the main power source of the vehicle does not need to remain active when the auxiliary power source does not need power. Implicitly, the user of such a vehicle may also experience time savings, as they would not need to shuttle between the main control of the main power source of the vehicle and the control of the auxiliary equipment.

Herein, the term 'key reader' is intended to describe any tool capable of receiving, transmitting and/or relaying a signal, and producing an electromagnetic signal. The key reader may comprise a computer with wired connections. The key reader may comprise a coil, for example an electromagnetic coil. The term 'transponder' is intended to comprise any tool capable of being energized to produce and transmit a unique signal.

Figure 1B:
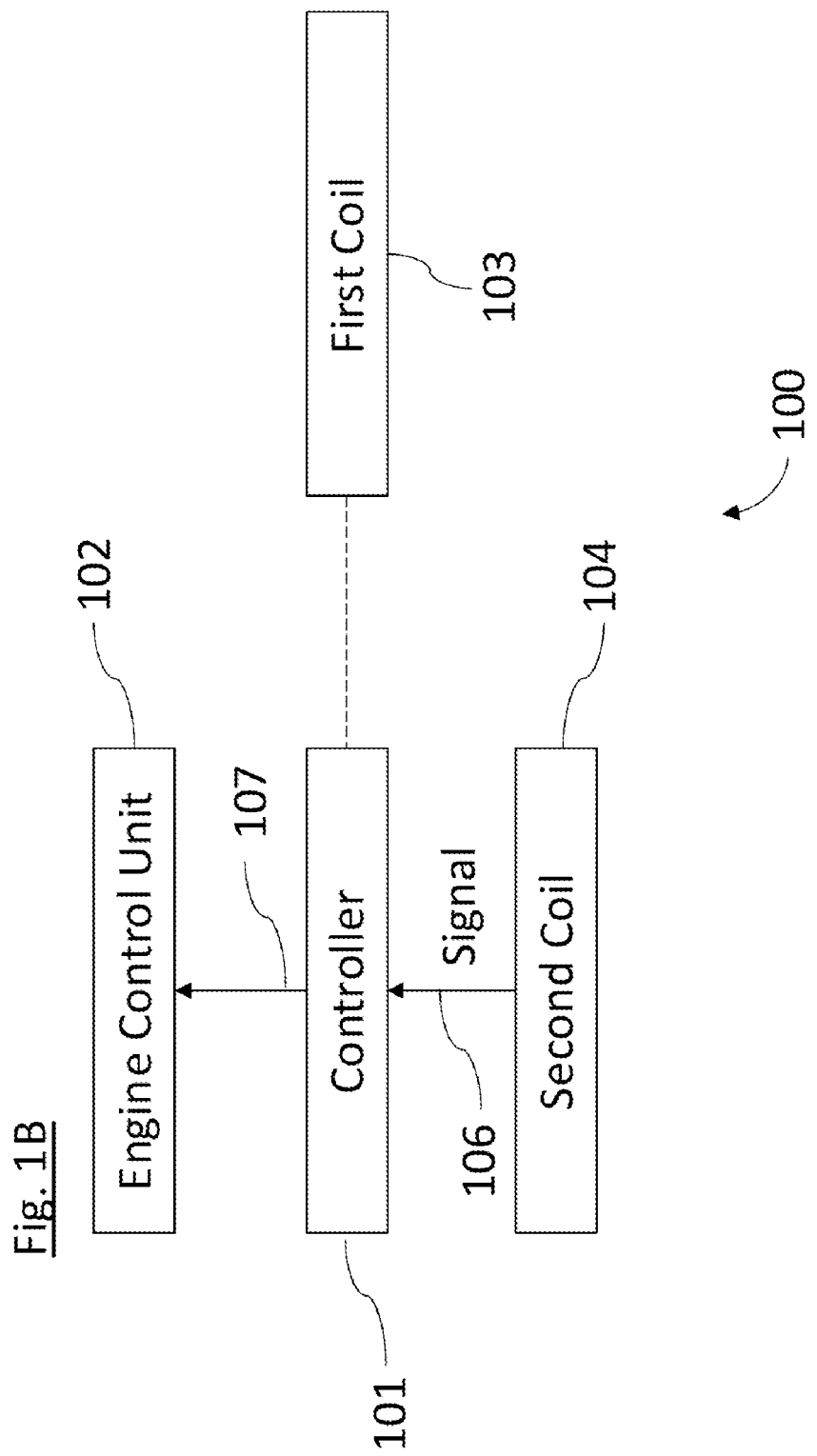
FIG. 1B is a block diagram showing an embodiment of the vehicle apparatus operable in the second mode.

FIGS. 1A and 1B each show a vehicle apparatus 100 comprising a controller 101, an engine control unit 102, a first key reader 103, and a second key reader 104. FIG. 1A shows the vehicle apparatus operating in a first mode in which the controller 101 is configured to receive a signal 105 from the first key reader 103 (as indicated by the solid line from the controller to the first key reader). The controller 101 is also not configured to receive a signal from the second key reader (as indicated by the dotted line from the controller to the second key reader). The controller 101 is configured to perform an authentication process on the signal 105. If the signal 105 is determined to be authentic, the controller is configured to transmit a signal 107 to the engine control unit (ECU) 102. Upon receipt of the signal 107, the ECU 102 is configured to start the engine. In this way, the apparatus in the first mode is configured to start the engine upon receipt of an authentic signal from the first key reader 103.

FIG. 1B shows the vehicle apparatus 100 operating in a second mode in which the controller 101 is configured to receive a signal 106 from the second key reader 104 (as indicated by the solid line from the controller to the second key reader). The controller 101 is also not configured to receive a signal from the first key reader (as indicated by the dotted line from the controller to the first key reader). The controller 101 is configured to perform an authentication process on the signal 106. If the signal 106 is determined to be authentic, the controller is configured to transmit a signal 107 to the ECU 102. As above for FIG. 1A, upon receipt of the signal 107, the ECU 102 is configured to start the engine. In this way, the apparatus in the second mode is configured to start the engine upon receipt of an authentic signal from the second key reader 104.

The signal 105, 106 transmitted by the first and second key reader 103, 104 and received by the controller 101 from the first or second key reader 103, 104 may be any suitable type of signal, for example an optical signal, an electromagnetic signal, an electric signal, a radio signal, etc., or any other appropriate form of signal that could carry unique information suitable for the purposes of authentication. The controller 101 could be a computing device embedded within the vehicle, for example the controller could be a component of the engine control unit 102 of the vehicle. For example, the vehicle may comprise the controller. The controller may comprise part of a passive anti-theft system (sometimes referred to as a PATS), for example a PATS module. The receipt, and authentication, of a signal from a vehicle key to cause the ECU to start the engine will now be described with reference to FIG. 2.

Figure 2A:
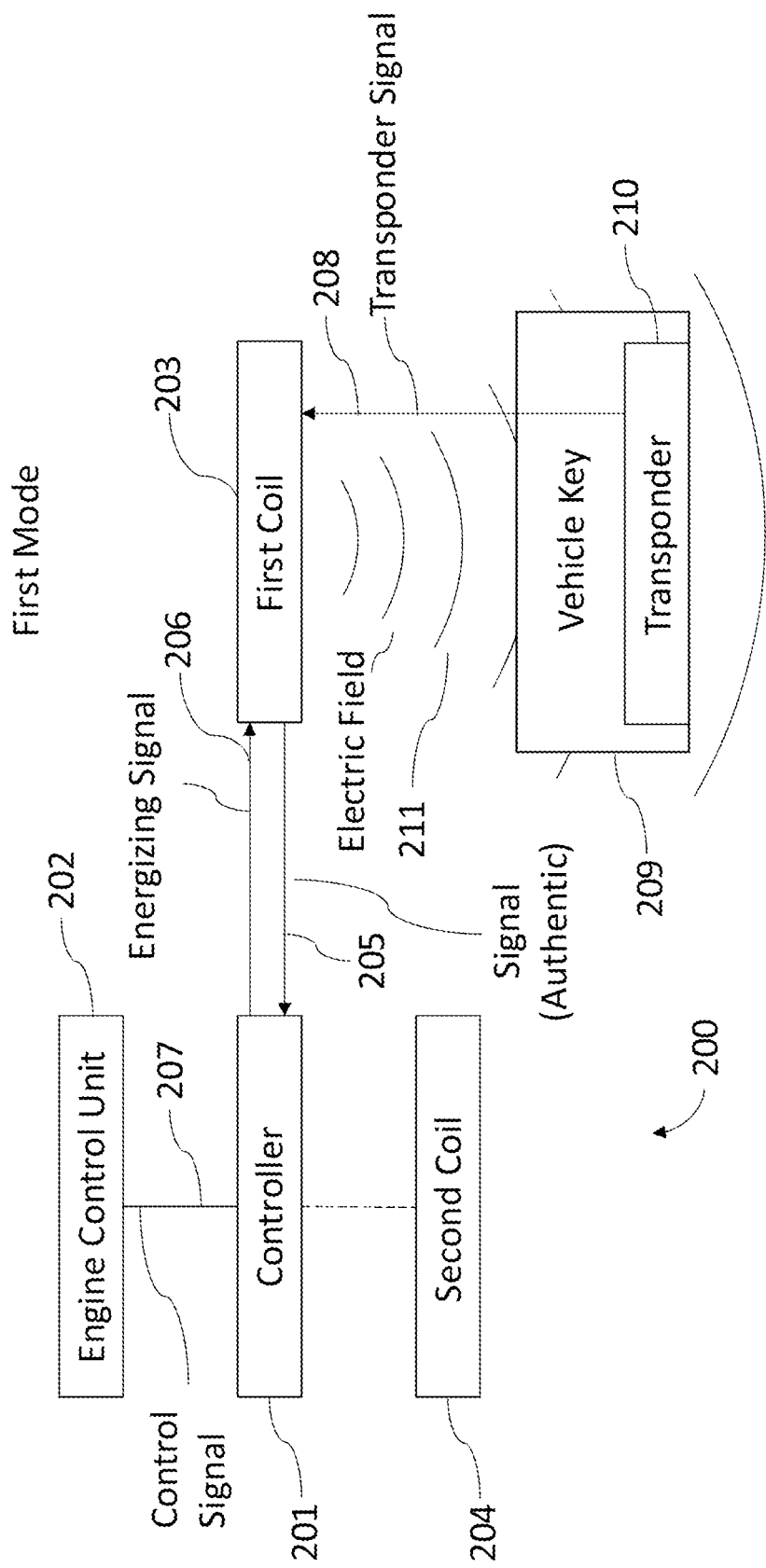
FIG. 2A is a block diagram showing another embodiment of the vehicle apparatus operable in the first mode.
Figure 2B:
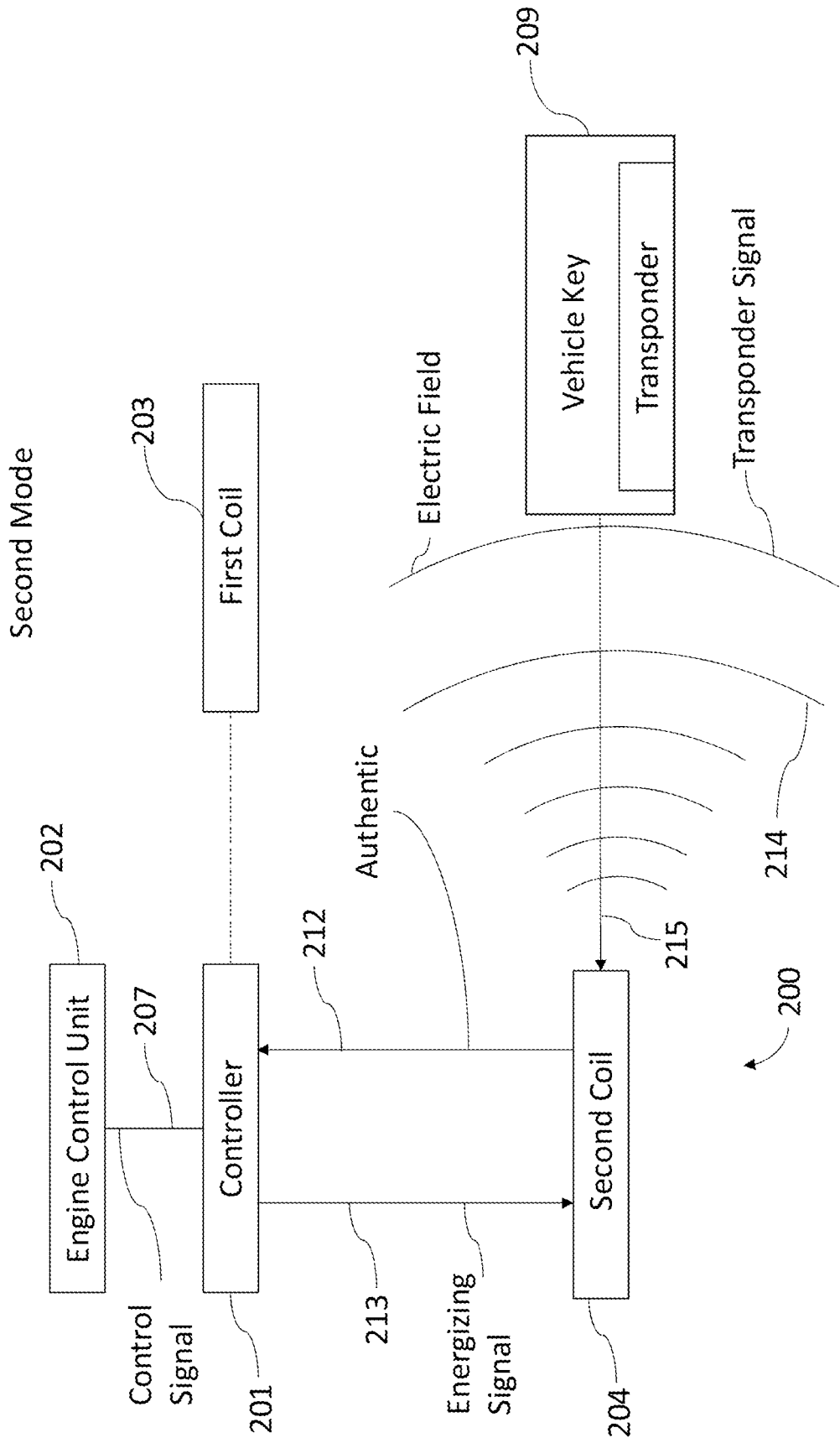
FIG. 2B is a block diagram showing another embodiment of the vehicle apparatus operable in the second mode.

FIGS. 2A and 2B show another example vehicle apparatus 200 (which may comprise the vehicle apparatus 100), operating in a first and second mode, respectively. The vehicle apparatus 200 further comprises a vehicle key 209, which in turn comprises a transponder 210. In this embodiment, the controller 201 is configured to transmit a signal (e.g., an energizing signal) 206 to the first key reader 203 to energize the first key reader 203 to produce an electromagnetic field. In other words, upon receipt of the energizing signal 206, the first key reader produces an electromagnetic field 211. If the vehicle key 209 is placed within the electromagnetic field 211, the transponder 210 will be energized such that it produces a unique signal 208, with the first key reader being configured to receive the signal. Upon receipt of the unique signal 208, the first key reader produces a signal 205. The controller is configured to receive this signal 205 as described above with reference to the signal 105 of FIG. 1A. The controller 201 then performs an authentication process on the signal 205 and, if the signal 205 is determined to be authentic, the controller then provides a signal 207 to the engine control unit 202 such that it is enabled to allow the engine of a vehicle to be activated (as also described above with reference to FIG. 1A). FIG. 2B shows the apparatus 200 operating in the second mode. The controller 201 is configured to transmit a signal (e.g., an energizing signal 213) to the second key reader 204 to energize the second key reader 204 to produce an electromagnetic field. In other words, upon receipt of the energizing signal 213, the first key reader 203 produces an electromagnetic field 214. If the vehicle key 209 is placed within the electromagnetic field 214, the transponder 210 will be energized such that it produces a unique signal 215, with the second key reader being configured to receive the signal. Upon receipt of the unique signal 215, the second key reader 204 produces a signal 212. The controller is configured to receive this signal 212 as described above with reference to signal 106 in FIG. 1B. The controller 201 then performs an authentication process on the signal 212 and, if the signal 212 is determined to be authentic, the controller then provides a signal 207 to the engine control unit 202 such that it is enabled to allow the engine of a vehicle to be activated (as also described above with reference to FIG. 1B).

The field 211, 214 produced by the key reader could be any suitable type of field, for example an optical field (e.g. infrared light), a vibrational field, a sonic field or any other field capable of energizing the transponder 210 of the vehicle key 209. It will therefore be appreciated from FIGS. 1 and 2 that the correct vehicle key is able to cause the engine to be started via the signal transmitted to the controller via the first or second key reader (depending on which key reader the key is near and in which mode the apparatus is operation). As will be described below the controller may be configured to send the "energizing" signal 206 when in the first mode upon meeting a precondition (for example, the vehicle key being proximate a control of the vehicle, e.g., received in the ignition barrel or within a predetermined distance of a vehicle control etc.) and may be configured to send the "energizing" signal 213 when in the second mode upon actuation by a second actuator (this will also be described below).

FIG. 3 shows a vehicle 350 comprising a vehicle apparatus 300. The vehicle apparatus may comprise the apparatus 100 or 200 as described above with respect to FIGS. 1 and 2. In this configuration, the first key reader 303 is proximate to a drive control 305 of the vehicle (e.g., a steering wheel or dash panel of the vehicle etc.) and the second key reader 304 is remote from the drive control 305 of the vehicle. In FIG. 3, the second key reader 304 is depicted as being part of a work station, or work platform 310, (e.g., an aerial work platform) but the second key reader could be otherwise located. The second key reader 304 may therefore be disposed outside of the vehicle interior (e.g., the vehicle cabin) and the first key reader 303 may be disposed inside the vehicle. In some examples, the second key reader 304 could be disposed within the vehicle 350 but still remote from the drive control 305 relative to the first key reader 303.

Figure 4A:
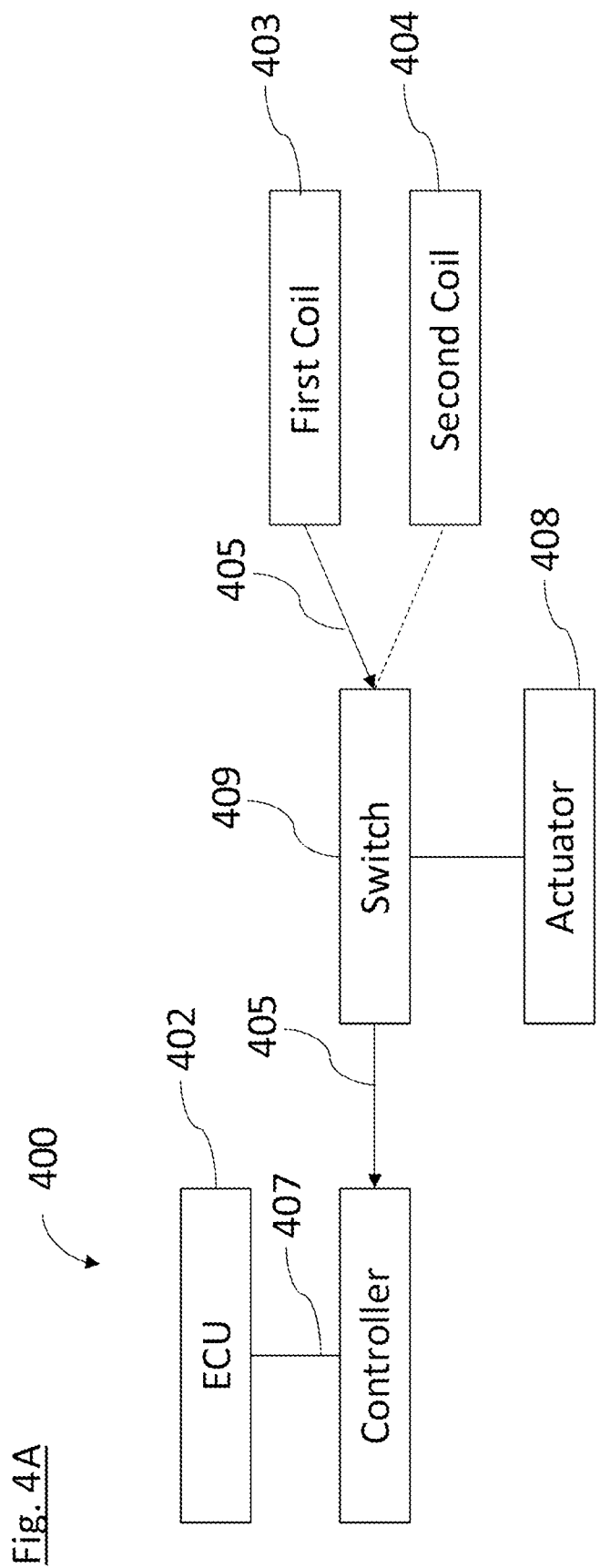
FIG. 4A is a block diagram showing yet another embodiment of the vehicle apparatus operable in the first mode.
Figure 4B:
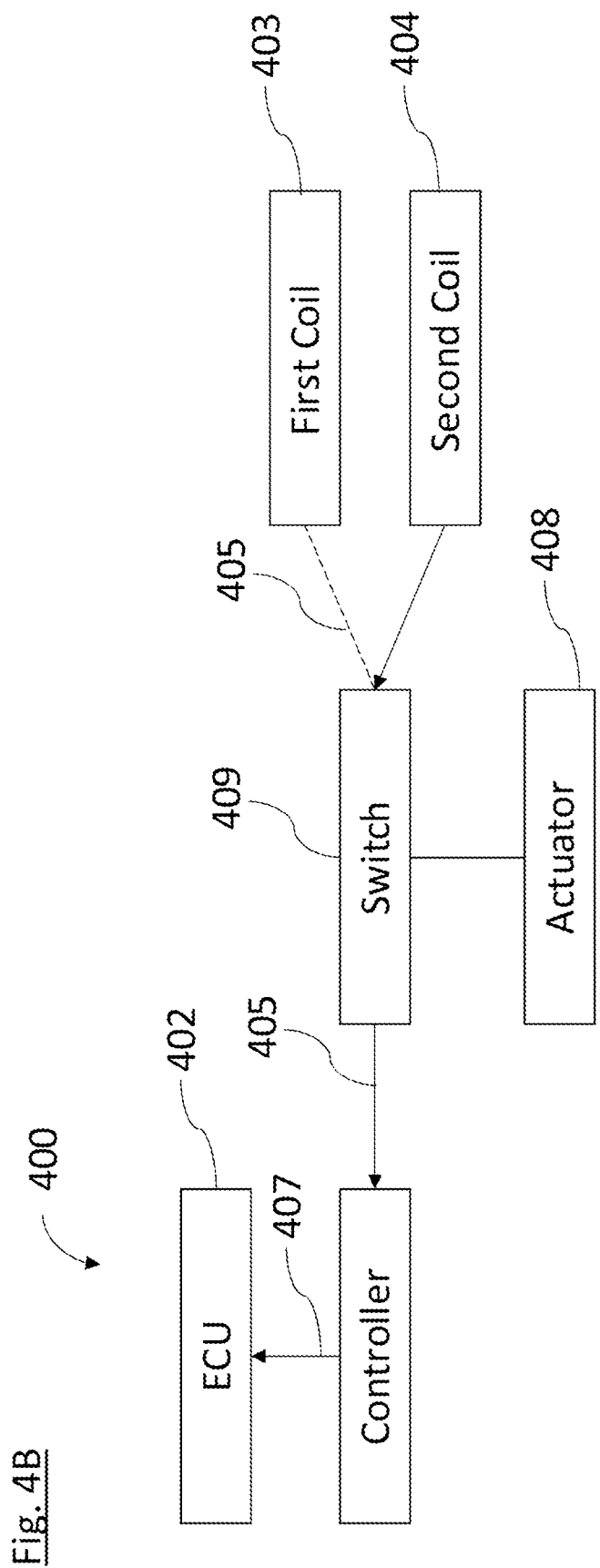
FIG. 4B is a block diagram showing yet another embodiment of the vehicle apparatus operable in the second mode.

FIG. 4A shows another example vehicle apparatus 400 (which may describe any of the vehicle apparatus 100-300 as described above) operating in its first mode and FIG. 4B shows the apparatus 400 operating in its second mode. This embodiment further comprises a first actuator 408 and a first switch 409. A connection, or link, 410 connects the first actuator 408 to the first switch 409. The first switch 409 has a first configuration (FIG. 4A) in which the first switch connects the controller 401 to the first key reader 403. In the first configuration, the first switch does not connect (e.g., isolates) the controller 401 and the second key reader 404. The first switch 409 has a second configuration (FIG. 4B) in which the first switch connects the controller 401 to the second key reader 404. In the second configuration, the first switch does not connect (e.g., isolates) the controller 401 and the first key reader 403. The first switch 409 is movable between from the first configuration of FIG. 4A to the second configuration of FIG. 4B via the first actuator 408. In the first configuration, the first switch 409 configures the controller 401 to receive a unique signal 405 from the first key reader 403 and upon authentication of the signal 405 by the controller 401, a signal 407 is sent to the engine control unit 402 enabling the engine of a vehicle to be activated, as described above. In the second configuration, the first switch 409 configures the controller 401 to receive a unique signal 406 from the second key reader 404 and upon authentication of the signal 406 by the controller 401, a signal 407 is sent to the engine control unit 402 enabling the engine of a vehicle to be activated, as described above. In other words, the configuration of the first switch determines in which mode the apparatus operates. As the actuator 408 is configured to change the configuration of the switch, the actuator is configured to determine in which mode the apparatus operates. As described above (e.g., FIG. 3) when the second key reader is a remote key reader the second mode may be referred to as a "remote mode" in the sense that in this mode the controller is configured to authenticate, and start a signal if authentic, a signal received from a vehicle key via the remote key reader.

In some examples, the controller 401 may comprise the switch 409. The switch 409 may comprise an electrical relay (for example, an R5 relay). The first actuator 408 may be a physical button or switch directly operable by the user. Alternatively, the first actuator 408 may be accessible to the user via a graphic user interface of a vehicle, a voice command system, by virtue of an application installed on a mobile computing device (e.g., a smartphone) or any other suitable means. The link 410 may be implemented by means of a Bluetooth signal, wire, or any other means suitable for linking the first actuator 408 to the first switch 409. All links mentioned herein may be implementable as such.

The first actuator 408 may therefore be configured to place the apparatus into its "remote mode." As the first actuator 408 may be user-manipulatable, a user may, via the first actuator, place the apparatus in its second mode.

Figure 5:
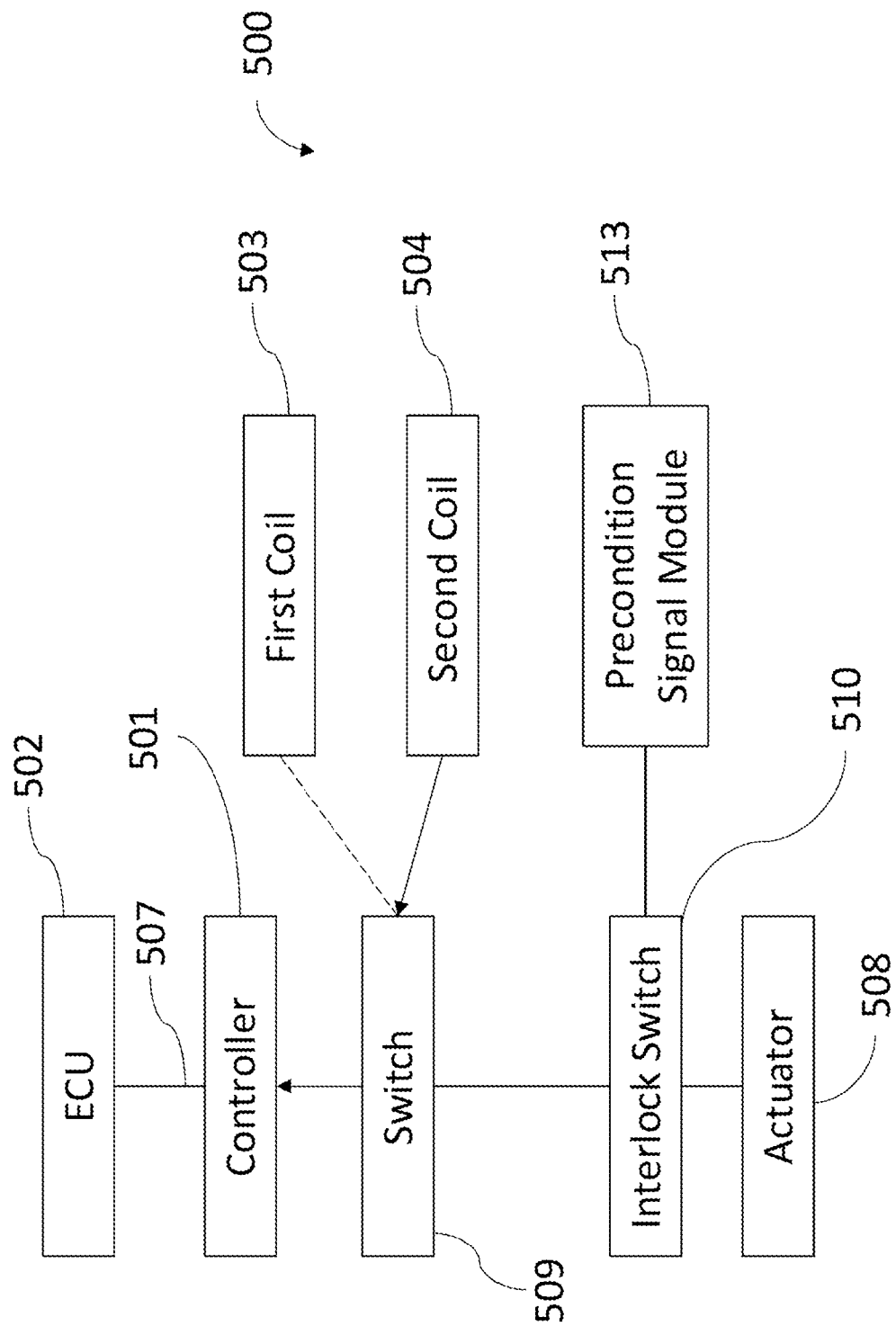
FIG. 5 is a block diagram showing yet another embodiment of the vehicle apparatus operable in the first mode.

FIG. 5 shows another example vehicle apparatus 500 (which may comprise any of the apparatus 100-400 as described above). In the apparatus 500 of these examples, the first actuator 508 (which may comprise the first actuator 408, etc.) is not able to actuate the switch (e.g., is not able to cause a change in configuration of the switch) and is not there able to place the apparatus in its second mode, unless one precondition or interlock condition (which may be referred to as an interlock) is met, or present. For this purpose, the apparatus 500 comprises an interlock switch 510 operably connected to the first actuator 508 and to the first switch 509. The interlock switch may connect the first actuator 508 to the first switch 509. The interlock switch may comprise an electrical switch. In a closed state the interlock switch 510 is configured to connect the first actuator 508 to the first switch 509 and in an open state the interlock switch 510 is configured to isolate (e.g., not connect) the first actuator 508 from the controller 501. Therefore, the first actuator can only actuate the first switch to its second configuration, to thereby place the apparatus in the second (remote) mode, when an interlock condition is present. The interlock switch 510 is configured to move from its open state to its closed state only if an interlock condition (or conditions) is/are present. The apparatus comprises a precondition signal module 513 configured to determine whether the vehicle has satisfied the at least one precondition. The precondition signal module 513 is also configured to actuate the interlock switch 510 from its open state to its closed state when the vehicle has satisfied the at least one precondition. In this way, the interlock switch can only be caused to close (to connect the first actuator to the first switch) when the precondition is present (as determined by the module 513).

The precondition may be at least one of the clutch pedal being at least partially depressed, a cabin of the vehicle being locked, a handbrake of the vehicle being activated, a throttle of the vehicle being disengaged, and a brake pedal of the vehicle being at least partially depressed.

Therefore, when the vehicle apparatus is operating in its first mode, the ability for the vehicle apparatus to be placed in its second operable mode may be dependent on whether the vehicle meets the at least one precondition since unless this condition is met the first actuator cannot close the first switch to place the apparatus in its second mode. If the vehicle has not satisfied the at least one precondition then the precondition signal module does not send a signal to the interlock switch 510 and the interlock switch 510 remains in its open state thereby isolating the first actuator 508 from the controller 501. This is to prevent a user from placing the vehicle apparatus 500 in its second operable mode without the at least one precondition being satisfied.

Figure 6:
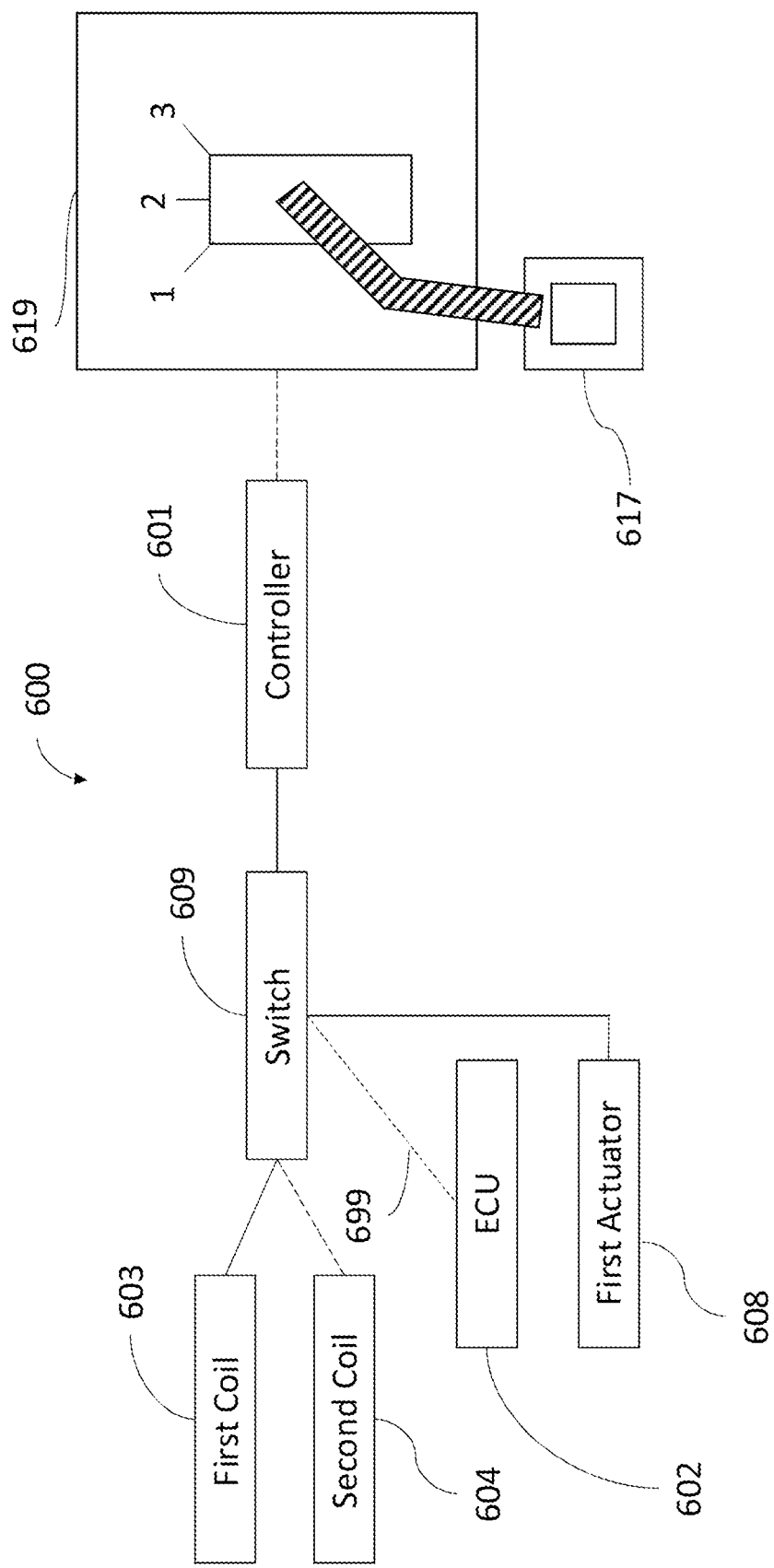
FIG. 6 is a block diagram showing yet another embodiment of the vehicle apparatus operable in the second mode.

FIG. 6 shows another example of a vehicle apparatus 600. This example further comprises an ignition barrel 619 in which a vehicle key 617 is able to be inserted and turned to a number of predetermined positions. As shown in FIG. 6, when the vehicle key 617 is placed in the ignition barrel 619 and turned to a predetermined position, the controller is energized. Put another way, inserting the vehicle key 617 into the ignition barrel 619 and turning the key to a predetermined position causes power (e.g., 12V) to be supplied to the controller 601—then, the controller can energize the first key reader 603, etc., and the authentication and engine starting process can begin as described above.

A first actuator 608 may be configured to cause the first switch to move to its second configuration only when power is supplied to the controller (e.g., by virtue of the key being in the ignition barrel as described above) and/or when the engine is running (e.g., having been started by the ECU). Then, when these conditions are met, the apparatus may be caused to be put into its second mode by the first actuator. Furthermore, the first actuator may cause power to be supplied to the controller—for example when the switch is in its second configuration it is configured to connect the controller to a power source. In this way, there is a secondary power source to the controller and/or the ECU—separate from the key being at a predetermined position in the ignition barrel—so that when the apparatus is in its second mode the controller/ECU continues to supply power to the engine (see line 699). Then, in this mode, the engine can be stopped when the user is remote from the vehicle (e.g., by actuating an actuator). Therefore, this mode of operation can be considered to be a remote start/stop mode.

Figure 7:
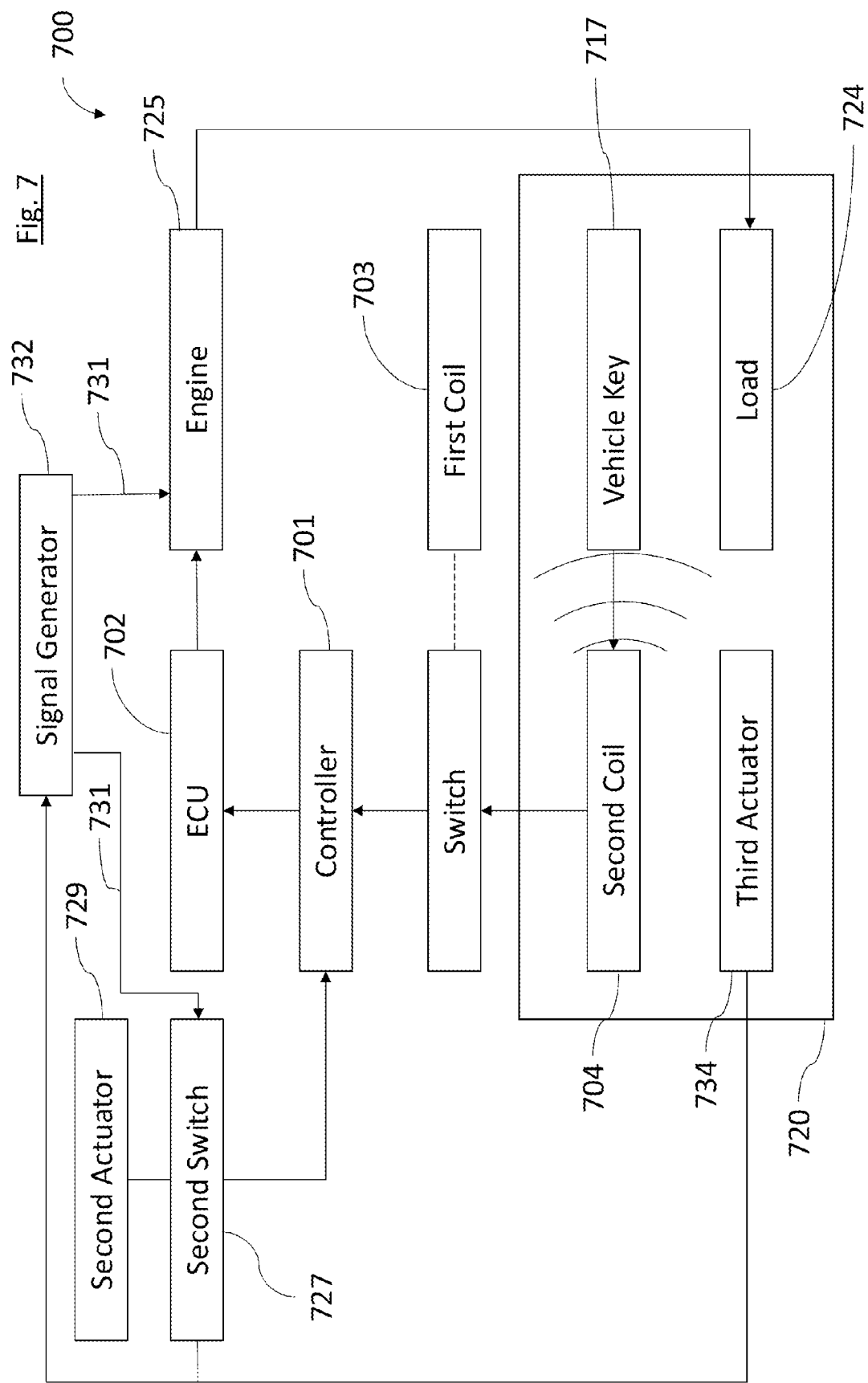
FIG. 7 is a block diagram showing yet another embodiment of the vehicle apparatus operable in the second mode.

FIG. 7 shows another example vehicle apparatus 700 (which may comprise any of the vehicle apparatus 100-600 above) operating in its second mode. This embodiment further comprises a second switch 727, a second actuator 729, a signal generator 732, a third actuator 734, and also explicitly depicts auxiliary equipment 720 of the vehicle further comprising a load 724 to be supplied by the main power source (e.g., engine) of the vehicle. In other words, the auxiliary equipment 720 may be occupied by a user to perform a job and, as such, the user may require remote access to the engine 725 without accessing the main cabin of the vehicle. Therefore, the user may have placed the apparatus in the second mode as described above. The second key reader 704 is proximate the auxiliary equipment 720 and therefore the second mode of operation is one where the controller is configured to cause the ECU to activate the engine on receipt of an authentic signal from the vehicle key via the second key reader 704. As the second key reader 704 and the third actuator 734, etc. are remote from the vehicle, this will remotely start the engine to thereby allow the auxiliary equipment 720 to be lowered, for example. This functionality will now be described.

Initially, the engine 725 is deactivated, the user of the vehicle having placed the vehicle apparatus in the second mode and, when the auxiliary equipment 720 is in the appropriate configuration (e.g., the appropriate height) the user may wish to start the engine so that they can use the engine's power to use the auxiliary equipment again. In the second mode, the controller is configured to receive a signal from the second key reader 704. However, to energize the second key reader 704, power needs to be supplied to the controller since, in an initial configuration, the controller and engine are in an OFF, unpowered, state as the user has been working. The second actuator 729 is configured to operate a second switch 727 when a condition is met, so that the user is prevented from powering the controller to start the engine (upon receipt of an authentic signal) until this condition is met. In this example, the condition is the engine receiving a signal to "mimic" or describe the clutch pedal of the vehicle being at least partially depressed and the existence of this condition is due to many engines having an override such that the engine won't start unless the clutch pedal is at least partially depressed. The third actuator 734 is configured to connect, or isolate, the second actuator 729 and the second switch 727. Actuation of the third actuator 734 is configured to supply a signal to the engine, that signal mimicking an at least partial depression of the clutch pedal, and also to connect the second actuator 724 to the second switch 727. More specifically, actuation of the third actuator 734 causes a signal generator 732 to generate the signal as described above and to send this signal to the engine, in addition to the third actuator connecting the second actuator and second switch. In this way, a user actuates the third actuator to override the engine interlock which will cause the second actuator to be connected to the second switch. Then, the user may actuate the second actuator which will cause the controller to be energize (e.g., power to be supplied to) the controller. The controller 701 can then energize the second key reader 704 such that, when the vehicle key 717 is brought proximate an electromagnetic field generated by the second key reader 704, the key authentication process can take place (as discussed above). The user is therefore able to start the engine remotely.

The vehicle key may have a second predetermined position disposed within, or near a control panel of the auxiliary equipment 720 (not shown). The second actuator 729 may comprise a low voltage power source such as a 12V battery. The second actuator may be disposed within the vehicle. The third actuator 734 may be a physical button or switch operable by the user (e.g. pressable, or automatically controllable (e.g. automated) from auxiliary equipment, etc.). Alternatively, the actuator may be accessible to the user via a graphic user interface of a vehicle, a voice command system, by virtue of an application installed on a mobile computing device (e.g., a smartphone) or any other suitable means. The third actuator 734 may be disposed within the control panel of the auxiliary equipment 720. The signal 731 generated by signal generator 732 may represent the clutch of the vehicle being at least partially depressed. The signal generated by the signal generator 732 may comprise a PWM signal to represent the clutch of the vehicle being at least partially depressed.

In some examples, sending the signal (e.g., the PWM signal) is an output to simulate the clutch pedal being pressed when all the system interlock requirements are being met. An interlock that may be required to be present may comprise a ground and 12V signals in series via certain relays. Therefore, starting the engine in the remote mode, by the second key reader, may not be possible until the PWM signal has replicated the clutch pedal being at least partially depressed and an interlock is present, the interlock comprising power (e.g., a 12V signal) being supplied to the controller.

In one example, with continuing reference to the preceding figures, the correct, authenticated, signal being received from the first key reader and the at least one interlock condition being met may be inputs to an AND gate, which may be configured to allow the controller to start the engine when these inputs are met (see FIG. 5). Similarly (see FIG. 7), the PWM signal being sent to the engine and the 12V power supply being supplied to the controller (and the authenticated signal being received from the second key reader) may each be inputs to an AND gate which may be configured to allow the controller to start the engine when these conditions are met.

Figure 8:
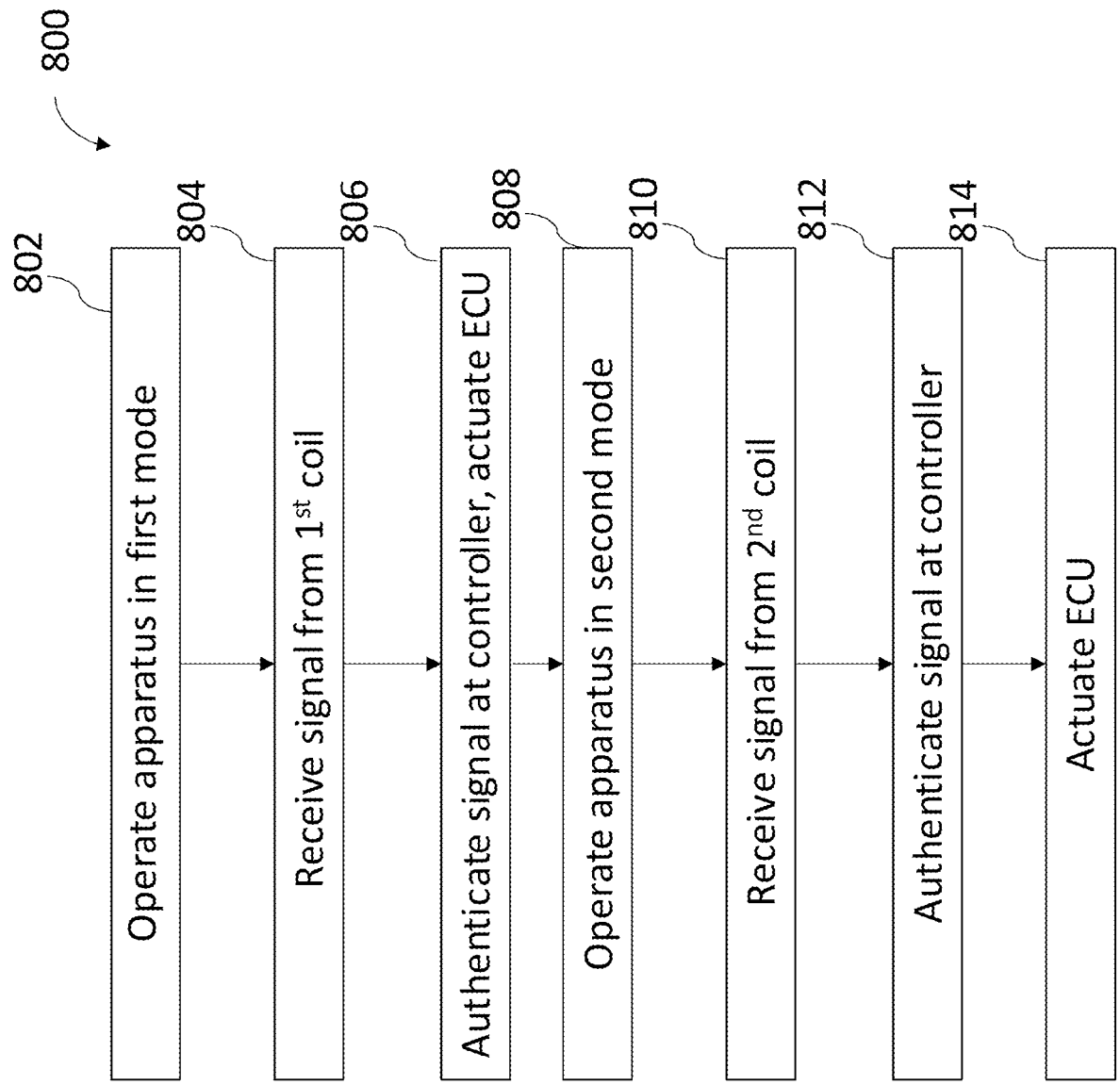
FIG. 8 is a flowchart of an example process that may be executed by the vehicle apparatus.

FIG. 8 shows an example method 800 which may comprise a method of operating any one of the vehicle apparatus as described above, or which may be performed by any one of the vehicle apparatus as described above. At block 802, the method comprises operating, e.g., by a controller or processor, the apparatus (the apparatus comprising a controller configured to actuate an engine control unit upon receipt of an authentic signal) in a first mode in which the controller is configured to receive a signal from a first key reader (e.g., a first coil). At block 804, the method comprises receiving, e.g., at a controller or processor, a signal from the first key reader. At block 806, the method comprises authenticating, e.g., by a controller or processor, the signal received from the first key reader and actuating, by a controller or processor, the engine control unit. At block 808, the method comprises operating, e.g., by a controller or processor, the apparatus in a second mode in which the controller is configured to receive a signal from a second key reader. At block 810, the method comprises receiving, e.g., at a controller or processor, a signal from the second key reader. At block 812, the method comprises authenticating, e.g., at a controller or processor, the signal received from the second key reader. At block 814, the method comprises actuating, by a controller or processor, the engine control unit. The method may comprise a method of remotely actuating a vehicle, e.g., remotely starting and/or stopping a vehicle engine.

The method 800 may further comprise (e.g., when the apparatus is in its first mode) energizing the first key reader (e.g., by a controller or processor), creating, at the first key reader, an electromagnetic field, placing a vehicle key in the electromagnetic field, transmitting a signal from the vehicle key to the first key reader (e.g., by a transponder of the key), transmitting a signal from the first key reader to the controller, authenticating, by the controller, the signal received from the first key reader, and actuating, by the controller, the engine control unit.

The method 800 may further comprise (e.g., when the apparatus is in its second mode) energizing the second key reader (e.g., by a controller or processor), creating, at the second key reader, an electromagnetic field, placing a vehicle key in the electromagnetic field, transmitting a signal from the vehicle key to the second key reader (e.g., by a transponder of the key), transmitting a signal from the second key reader to the controller, authenticating, by the controller, the signal received from the second key reader, and actuating, by the controller, the engine control unit.

Block 802 may comprise actuating a first switch to a first configuration to electromagnetically connect the controller to the first key reader. Block 808 of the method may comprise actuating a first switch to a second configuration to electromagnetically connect the controller to the second key reader. The first switch may be as discussed above. Block 808 may comprise determining whether at least one precondition is met and, if it is determined that if one of the at least one precondition is met, then block 808 may comprise actuating a first switch to a second configuration to electromagnetically connect the controller to the second key reader.

As stated above, the precondition may comprise at least one of the clutch pedal being at least partially depressed, a cabin of the vehicle being locked, a handbrake of the vehicle being activated, a throttle of the vehicle being disengaged, and a brake pedal of the vehicle being at least partially depressed.

In some examples, an interlock switch electromagnetically connects the switch actuator to the first switch when the interlock switch is in a closed state and the method may comprise closing the interlock switch to electromagnetically connect the switch actuator and to the first switch, so that the switch actuator can actuate the first switch to the second configuration, when one of the at least one of the above preconditions is met.

The method may comprise operating apparatus in the first mode, placing a vehicle key into an ignition barrel of the vehicle, turning the vehicle key to a predetermined position in the barrel, receiving, at the controller, an authentic signal from the first key reader, causing power to be supplied to the engine control unit to thereby run the engine. The method may comprise placing operating the apparatus in the second mode, removing the vehicle key from the ignition barrel, and continuing to supply power to the engine control unit to thereby run the engine whilst operating the apparatus in the second mode.

The method may further comprise, when the engine is in an off state and the apparatus is in the second mode, receiving, at the engine, a signal indicating that a clutch pedal of the vehicle has been at least partially depressed, and, upon receipt of an authenticated signal from the second key reader, causing power to be supplied to the engine control unit to thereby run the engine when the apparatus is in the second mode, the engine thereby being remotely started.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," etc. should be read to recite one or more of the indicated elements unless a claim recites an explicit limitation to the contrary.

What is claimed is:

1. A vehicle apparatus comprising:
   a controller configured to actuate an engine control unit of a vehicle upon receipt of an authenticated signal to provide power to auxiliary equipment;
   a first key reader accessible in a cabin of the vehicle apparatus and configured to obtain an authentication signal from a user's key; and
   a second key reader associated with the auxiliary equipment of the vehicle apparatus, configured to obtain the authentication signal from the user's key, and remote from a driving control of the vehicle;
   wherein the controller is configured to receive the authentication signal and to authenticate the signal, and wherein the vehicle apparatus is operable in a first mode in which the controller is configured to receive the authentication signal only from the first key reader and in a second mode in which the controller is configured to receive the authentication signal only from the second key reader.

2. The vehicle apparatus according to claim 1, wherein each of the first and second key readers are energizable to produce an electromagnetic field configured to energize a transponder of the user's key.

3. The vehicle apparatus according to claim 1, wherein, when the apparatus is operable in the first mode, the controller is configured to energize the first key reader and, when the vehicle apparatus is operable in the second mode, the controller is configured to energize the second key reader.

4. The vehicle apparatus according to claim 1, wherein the first key reader is proximate the driving control of the vehicle.

5. The vehicle apparatus according to claim 1, further comprising:
   a first switch operable in a first configuration in which the first switch connects the controller to the first key reader and in a second configuration in which the first switch connects the controller to the second key reader.

6. The vehicle apparatus according to claim 5, wherein the first switch is configured to operate in the first configuration when the apparatus is operable in the first mode and wherein the first switch is configured to operate in the second configuration when the apparatus is operable in the second mode.

7. The vehicle apparatus according to claim 6, further comprising:

a first actuator configured to move the first switch between its first and second configurations, the first actuator thereby being configured to cause the apparatus to operate in its first and second modes.

8. The vehicle apparatus according to claim 7, wherein the first actuator is configured to cause the apparatus to transition from its first mode to its second mode only if at least one precondition is met.

9. The vehicle apparatus according to claim 7, further comprising:
an interlock switch operably connected to the first actuator, the interlock switch being movable between a closed state and an open state, wherein the interlock switch, when in its closed state, is configured to connect the first actuator to the first switch and, when in its open state, is configured to isolate the first actuator from the first switch, and wherein the interlock switch is configured to switch from its open state to its closed state only when at least one precondition is met.

10. The vehicle apparatus according to claim 9, wherein the precondition is at least one of:
a clutch pedal of the vehicle being at least partially depressed;
the cabin of the vehicle being locked;
a handbrake of the vehicle being activated;
a throttle of the vehicle being disengaged; and
a brake pedal of the vehicle being at least partially pressed.

11. The vehicle apparatus according to claim 7, further comprising:
an ignition barrel, wherein the first key reader is proximate the ignition barrel;
wherein, when the apparatus is operating in its first mode, the controller is configured to actuate the engine control unit upon receipt of an authentic signal from the first key reader;
wherein the apparatus is configured such that power is supplied to the controller upon the user's key being inserted into the ignition barrel and turned to a predetermined position, and wherein the controller is configured to energize the first key reader when power is supplied to the controller;
wherein the first key reader is configured to produce an electromagnetic field when energized;
wherein a transponder of the user's key is configured to transmit a signal to the first key reader when the user's key is proximate the electromagnetic field produced by the first key reader, and wherein the first key reader is configured to transmit the signal received from the user's key to the controller;
wherein the controller is configured to authenticate the signal received from the user's key and further configured to actuate the engine control unit if the signal is authenticated, and;
wherein the first actuator is configured to cause power to be supplied to the engine control unit to thereby run the engine when the user's key is not inserted into the ignition barrel upon receipt of an authenticated signal.

12. The vehicle apparatus according to claim 11 further comprising:
a second actuator; and
a second switch movable between an open and a closed state;
wherein the second switch is configured to connect the second actuator to the controller when in its closed state and to electrically isolate the second actuator from the controller when in its open state, wherein the second actuator is configured to cause power to be supplied to the controller when the second switch is closed, and wherein the second switch is configured to move from its open state to its closed state upon receipt of a signal indicating that a vehicle clutch pedal is at least partially depressed.

13. The vehicle apparatus according to claim 12 further comprising:
a third actuator configured to cause a signal to be sent to the second switch via a signal generator, wherein the signal is indicative of the clutch pedal being at least partially depressed, the third actuator thereby being configured to cause the second switch to close.

14. A method of operating a control circuit to actuate an engine control unit of a vehicle, the method comprising the steps of:
operating the control circuit in a first mode wherein the control circuit is configured to:
receive a signal from a first key reader disposed inside a cabin of the vehicle;
authenticate the signal received from the first key reader; and
actuate the engine control unit in response to authenticating the signal; and
operating the control circuit in a second mode in which the control circuit is configured to:
receive a signal from a second key reader disposed externally of the cabin;
authenticate the signal received from the second key reader; and
actuate the engine control unit in response to authenticating the signal.

15. The method of claim 14 wherein the first mode is further configured to:
energize the first key reader;
create, at the first key reader, an electromagnetic field;
receive a user's key in the electromagnetic field;
transmitting a transponder signal from the user's key to the first key reader.

16. The method of claim 14 wherein the control circuit includes a first switch coupled to the first key reader and second key reader, and wherein the method further comprises the steps of:
actuating the first switch to a first configuration to select the first mode; and
actuating the first switch to a second configuration to select the second mode.

17. The method of claim 16 wherein the second mode is further configured to:
determine whether at least one precondition is met; and
if the at least one precondition is met, then actuating the first switch to the second configuration to select the second mode, enabling the control circuit to receive the signal from the second key reader.

18. The method of claim 17 wherein the at least one precondition comprises at least one of:
a clutch pedal of the vehicle being at least partially depressed;
the cabin being locked;
a handbrake of the vehicle being activated;
a throttle of the vehicle being disengaged; and
a brake pedal of the vehicle being at least partially pressed.

19. The method of claim 18 wherein the control circuit further includes an interlock switch coupled to the first switch, wherein the method further comprises the step of:

closing the interlock switch to connect a switch actuator to the first switch, so that the switch actuator actuates the first switch to the second configuration when the at least one of the preconditions is met.

20. The method of claim 14 wherein:

operating the control circuit in the first mode further comprises:

placing a user's key into an ignition barrel of the vehicle;

turning the user's key to a predetermined position in the barrel;

receiving an authentic signal from the first key reader;

causing power to be supplied to the engine control unit to thereby actuate the engine control unit to run an engine; and operating the control circuit in the second mode further comprises:

removing the user's key from the ignition barrel; and continuing to supply power to the engine control unit to thereby run the engine while operating the control circuit in the second mode.

* * * * *